United States Patent
Hiroe et al.

(10) Patent No.: US 10,746,043 B2
(45) Date of Patent: Aug. 18, 2020

(54) POWER SOURCE, ADJUSTING POWER INSTRUCTING APPARATUS, METHOD, AND RECORDING MEDIUM FOR CHANGING ADJUSTING POWER

(71) Applicant: MITSUBISHI HEAVY INDUSTRIES, LTD., Tokyo (JP)

(72) Inventors: Takaharu Hiroe, Tokyo (JP); Kazunari Ide, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/356,916

(22) Filed: Mar. 18, 2019

(65) Prior Publication Data

US 2019/0292933 A1 Sep. 26, 2019

(30) Foreign Application Priority Data

Mar. 22, 2018 (JP) .................................. 2018-055185
Jan. 16, 2019 (JP) .................................. 2019-005481

(51) Int. Cl.
*F01D 15/10* (2006.01)
*H02J 3/18* (2006.01)
(Continued)

(52) U.S. Cl.
CPC .............. *F01D 17/06* (2013.01); *F01D 15/10* (2013.01); *F01D 17/04* (2013.01); *F02C 7/32* (2013.01);
(Continued)

(58) Field of Classification Search
CPC . F01D 15/10; F01D 17/04; G05B 6/02; F02C 7/32
See application file for complete search history.

(56) References Cited

U.S. PATENT DOCUMENTS

2006/0082936 A1   4/2006  Ye et al.
2011/0309804 A1*  12/2011  Yasugi .................. F03D 7/0284
                                                                         322/19
(Continued)

FOREIGN PATENT DOCUMENTS

JP      H05-040530 A    2/1993
JP      2005-261070 A    9/2005
(Continued)

*Primary Examiner* — Ronald D Hartman, Jr.
(74) *Attorney, Agent, or Firm* — Osha Liang LLP

(57) ABSTRACT

A power source includes: a generator; a turbine device that drives and rotates the generator; and a control device that: monitors a rotation speed of the generator; calculates a first adjusting power instruction value corresponding to a deviation between a reference value and an observed value of the rotation speed of the generator; acquires an adjusting power amplification coefficient from an external device; calculates a second adjusting power instruction value indicating a degree of increase of the adjusting power, based on the first adjusting power instruction value and the adjusting power amplification coefficient; amplifies the adjusting power based on the second adjusting power instruction value; and outputs the amplified adjusting power to the turbine device to adjust power supply from the generator and reduces fluctuation of frequency in a power transmission and distribution system.

10 Claims, 23 Drawing Sheets

(51) Int. Cl.
*H02J 3/00* (2006.01)
*F01D 17/06* (2006.01)
*H02J 3/38* (2006.01)
*G05B 6/02* (2006.01)
*F01D 17/04* (2006.01)
*F02C 9/56* (2006.01)
*F02C 7/32* (2006.01)

(52) U.S. Cl.
CPC .................. *F02C 9/56* (2013.01); *G05B 6/02* (2013.01); *H02J 3/381* (2013.01); *F05D 2260/40* (2013.01); *F05D 2260/76* (2013.01)

(56) References Cited

U.S. PATENT DOCUMENTS

| | | |
|---|---|---|
| 2014/0328673 A1 | 11/2014 | Tamaoki |
| 2015/0001939 A1* | 1/2015 | Kojima ..................... H02J 3/24 307/52 |
| 2015/0229131 A1* | 8/2015 | Gerhardinger .......... H02J 3/385 307/22 |
| 2015/0338868 A1* | 11/2015 | Takaguchi ................ H02J 3/32 307/126 |
| 2016/0134114 A1* | 5/2016 | Gupta .................. H02J 3/1842 307/82 |
| 2016/0222816 A1 | 8/2016 | Chen et al. |
| 2016/0226249 A1* | 8/2016 | Sakuma ................ H02J 7/0068 |
| 2017/0054301 A1* | 2/2017 | Fintzos .................. H02J 3/386 |
| 2017/0179722 A1* | 6/2017 | Porter ....................... H02J 3/32 |
| 2017/0221161 A1* | 8/2017 | Kudo .................... G06F 1/3212 |
| 2017/0227978 A1* | 8/2017 | Kudo ........................ H02J 3/38 |
| 2018/0090987 A1* | 3/2018 | Hashimoto ......... H02J 13/0013 |
| 2018/0131183 A1* | 5/2018 | Kim .......................... H02J 3/38 |
| 2018/0351367 A1 | 12/2018 | Kogo et al. |
| 2019/0024634 A1* | 1/2019 | Tarnowski ............... H02J 3/386 |

FOREIGN PATENT DOCUMENTS

| | | |
|---|---|---|
| JP | 2013-147937 A | 8/2013 |
| JP | 2016-153645 A | 8/2016 |
| WO | 2017-090519 A1 | 6/2017 |

* cited by examiner

FIG. 19

| DELAY | IMPULSE RESPONSE OF POWER GENERATION AMOUNT TO FREQUENCY ($-g_\partial$) — D1 | | | | |
|---|---|---|---|---|---|
| | DROOP | | | | |
| | 3% | 4% | 5% | 6% | 7% |
| 0 | 0.221 | 0.181 | 0.154 | 0.134 | 0.119 |
| 1 | 0.221 | 0.181 | 0.154 | 0.134 | 0.119 |
| 2 | 0.158 | 0.141 | 0.126 | 0.113 | 0.103 |
| 3 | 0.113 | 0.110 | 0.103 | 0.096 | 0.089 |
| 4 | 0.081 | 0.086 | 0.084 | 0.081 | 0.077 |
| 5 | 0.058 | 0.067 | 0.069 | 0.069 | 0.067 |
| 6 | 0.042 | 0.052 | 0.057 | 0.058 | 0.058 |
| 7 | 0.030 | 0.040 | 0.046 | 0.049 | 0.050 |
| 8 | 0.021 | 0.031 | 0.038 | 0.042 | 0.044 |
| 9 | 0.015 | 0.025 | 0.031 | 0.035 | 0.038 |
| 10 | 0.011 | 0.019 | 0.025 | 0.030 | 0.033 |
| 11 | 0.008 | 0.015 | 0.021 | 0.025 | 0.028 |
| 12 | 0.006 | 0.012 | 0.017 | 0.021 | 0.025 |
| 13 | 0.004 | 0.009 | 0.014 | 0.018 | 0.021 |
| 14 | 0.003 | 0.007 | 0.011 | 0.015 | 0.019 |
| 15 | 0.002 | 0.005 | 0.009 | 0.013 | 0.016 |
| 16 | 0.001 | 0.004 | 0.008 | 0.011 | 0.014 |
| 17 | 0.001 | 0.003 | 0.006 | 0.009 | 0.012 |
| 18 | 0.001 | 0.003 | 0.005 | 0.008 | 0.010 |
| 19 | 0.001 | 0.002 | 0.004 | 0.007 | 0.009 |
| 20 | 0.000 | 0.002 | 0.003 | 0.006 | 0.008 |
| 21 | 0.000 | 0.001 | 0.003 | 0.005 | 0.007 |
| 22 | 0.000 | 0.001 | 0.002 | 0.004 | 0.006 |
| 23 | 0.000 | 0.001 | 0.002 | 0.003 | 0.005 |
| 24 | 0.000 | 0.001 | 0.002 | 0.003 | 0.004 |
| 25 | 0.000 | 0.000 | 0.001 | 0.002 | 0.004 |
| 26 | 0.000 | 0.000 | 0.001 | 0.002 | 0.003 |
| 27 | 0.000 | 0.000 | 0.001 | 0.002 | 0.003 |
| 28 | 0.000 | 0.000 | 0.001 | 0.001 | 0.003 |
| 29 | 0.000 | 0.000 | 0.001 | 0.001 | 0.002 |
| 30 | 0.000 | 0.000 | 0.000 | 0.001 | 0.002 |
| 31 | 0.000 | 0.000 | 0.000 | 0.001 | 0.002 |

FIG. 24

| | WEIGHT COEFFICIENT w FOR EACH RMS OF FREQUENCY FLUCTUATION AT REPRESENTATIVE POINT | | | | | D2 |
|---|---|---|---|---|---|---|
| DELAY | 1.0 Hz | 0.5 Hz | 0.25 Hz | 0.125 Hz | 0.0625 Hz | |
| 0 | 0.221 | 0.181 | 0.154 | 0.134 | 0.119 | |
| 1 | 0.221 | 0.181 | 0.154 | 0.134 | 0.119 | |
| 2 | 0.158 | 0.141 | 0.126 | 0.113 | 0.103 | |
| 3 | 0.113 | 0.110 | 0.103 | 0.096 | 0.089 | |
| 4 | 0.081 | 0.086 | 0.084 | 0.081 | 0.077 | |
| 5 | 0.058 | 0.067 | 0.069 | 0.069 | 0.067 | |
| 6 | 0.042 | 0.052 | 0.057 | 0.058 | 0.058 | |
| 7 | 0.030 | 0.040 | 0.046 | 0.049 | 0.050 | |
| 8 | 0.021 | 0.031 | 0.038 | 0.042 | 0.044 | |
| 9 | 0.015 | 0.025 | 0.031 | 0.035 | 0.038 | |
| 10 | 0.011 | 0.019 | 0.025 | 0.030 | 0.033 | |
| 11 | 0.008 | 0.015 | 0.021 | 0.025 | 0.028 | |
| 12 | 0.006 | 0.012 | 0.017 | 0.021 | 0.025 | |
| 13 | 0.004 | 0.009 | 0.014 | 0.018 | 0.021 | |
| 14 | 0.003 | 0.007 | 0.011 | 0.015 | 0.019 | |
| 15 | 0.002 | 0.005 | 0.009 | 0.013 | 0.016 | |
| 16 | 0.001 | 0.004 | 0.008 | 0.011 | 0.014 | |
| 17 | 0.001 | 0.003 | 0.006 | 0.009 | 0.012 | |
| 18 | 0.001 | 0.003 | 0.005 | 0.008 | 0.010 | |
| 19 | 0.001 | 0.002 | 0.004 | 0.007 | 0.009 | |
| 20 | 0.000 | 0.002 | 0.003 | 0.006 | 0.008 | |
| 21 | 0.000 | 0.001 | 0.003 | 0.005 | 0.007 | |
| 22 | 0.000 | 0.001 | 0.002 | 0.004 | 0.006 | |
| 23 | 0.000 | 0.001 | 0.002 | 0.003 | 0.005 | |
| 24 | 0.000 | 0.001 | 0.002 | 0.003 | 0.004 | |
| 25 | 0.000 | 0.000 | 0.001 | 0.002 | 0.004 | |
| 26 | 0.000 | 0.000 | 0.001 | 0.002 | 0.003 | |
| 27 | 0.000 | 0.000 | 0.001 | 0.002 | 0.003 | |
| 28 | 0.000 | 0.000 | 0.001 | 0.001 | 0.003 | |
| 29 | 0.000 | 0.000 | 0.001 | 0.001 | 0.002 | |
| 30 | 0.000 | 0.000 | 0.000 | 0.001 | 0.002 | |
| 31 | 0.000 | 0.000 | 0.000 | 0.001 | 0.002 | |

POWER SOURCE, ADJUSTING POWER INSTRUCTING APPARATUS, METHOD, AND RECORDING MEDIUM FOR CHANGING ADJUSTING POWER

CROSS-REFERENCE TO RELATED APPLICATION

The present application claims priority to Japanese Patent Application No. 2018-055185 filed on Mar. 22, 2018 and Japanese Patent Application No. 2019-005481 filed on Jan. 16, 2019, the contents of which are incorporated herein by reference.

BACKGROUND

Technical Field

The present invention relates to a power source, adjusting power instructing apparatus, method, and recording medium for changing adjusting power.

Description of the Related Art

Frequencies of power transmission and distribution systems are maintained by combining "adjusting power" (defined below) from power sources based on (1) Governor Free (GF) operation, (2) Load Frequency Control (LFC), and (3) Economic load Dispatching Control (EDC), depending on fluctuation cycles of power demand. Due to electricity liberalization and deregulation, it is generally assumed that adjusting power is supplied from power generation companies to power transmission and distribution companies through public offering or on the market.

Power demand in offices, factories, and general households may fluctuate at any given moment. When the power demand exceeds the power supply, the frequency of the power transmission and distribution system drops below a reference value (e.g., 50 Hz or 60 Hz). Conversely, when the power supply exceeds the power demand, the frequency rises above the reference value. "Adjusting power" balances such fluctuations in supply and demand. When adjusting power is ideally supplied, the frequency coincides with the reference value.

Load frequency control (LFC) is used for balancing fluctuations in supply and demand of more than a few minutes but less than 30 minutes. LFC can supply adjusting power depending on frequency fluctuation in the power transmission and distribution system. Thus, when the frequency of the power transmission and distribution system does not reach the reference value, the general power transmission and distribution company that controls the system receives positive adjusting power from power generation companies. On the other hand, when the frequency of the power transmission and distribution system reaches or exceeds the reference value, the general power transmission and distribution company receives negative adjusting power from the power generation companies. With LFC, the power generation company supplies adjusting power by adjusting an output of the power source in response to instructions received from the general power transmission and distribution company.

To provide stable power supply with LFC, power generation companies must supply adjusting power exactly according to the instructions from the general power transmission and distribution company. For this reason, with the electricity liberalization and deregulation, a scheme has been considered where the power transmission and distribution company pays for the actually-supplied adjusting power (settlement of supply of the adjusting power) to the power generation company.

However, where the general power transmission and distribution company instructs the power generation company to supply adjusting power sharply fluctuating within a very short time period (e.g., a few seconds), the power generation company may not be able to respond to the instruction in time. In such a case, the power generation company may get a penalty. Moreover, the frequency differs for each location in the power transmission and distribution system. Although it is desirable to provide detailed instructions for each location in the power transmission and distribution system, doing so is impractical for fluctuations that occur within a short time period (e.g., 3 to 5 seconds).

For this reason, with respect to short-period demand fluctuation, adjustments are generally made through governor-free (GF) operations autonomously performed by power sources (comprising turbine devices and generators) managed or operated by the power generation companies. GF refers to an operation of controlling an amount of input (e.g., fuel) supplied to the turbine device to maintain a generator's rotation speed constant despite fluctuations in the rotation speed due to demand (load) variation. For example, when the power demand has increased within a short period, the generator's rotation speed lowers. According to GF operation, the amount of input (e.g., fuel) supplied to the turbine device is automatically increased depending on a deviation between an observed value of the lowered rotation speed and a reference value, and thereby the rotation speed is maintained at the reference value. The active power additionally generated by the generator for returning to the original rotation speed corresponds to an adjusting power (GF adjusting power) supplied through GF operation.

A power source that uses a turbine device as the driving force stores inertial energy with rotation of a rotor of the turbine device during operation. This inertial energy is automatically transferred between the generator and the load according to demand fluctuation, thereby contributing to stable frequency as cushioning (buffer) for frequency fluctuation due to the demand fluctuation.

Japanese Patent Application Laid-Open Publication No. 2016-153645 discloses a correcting system and method for a gas turbine proportional droop governor.

The power sources autonomously supply the adjusting power by GF operation or inertia energy regardless of the instructions from the power transmission and distribution system. Meanwhile, power sources performing solar photovoltaic generation do not autonomously supply the adjusting power by GF operation or inertia energy. Due to a recent increase of solar photovoltaic generation apparatuses, there is concern that the adjusting power corresponding to short-period demand fluctuation will be in short supply in the power transmission and distribution systems. This concern would grow more and more as solar photovoltaic generation increases.

Such a concern can be eliminated by increasing the GF adjusting power at existing power plants. At present, each of the power plants can set whether to execute GF operation, namely, ON/OFF of GF operation. However, it is difficult to cause each of the power plants to flexibly increase or decrease the degree of the adjusting power. For this reason, to increase the GF adjusting power in the power transmission and distribution systems, the number of the power plants performing GF operation needs to be increased. Therefore, flexible adjustment is difficult.

SUMMARY

One or more embodiments of the present invention provide a power source, adjusting power instructing apparatus, method, and recording medium that can flexibly change adjusting power supplied by governor-free (GF) operation.

A power source of one or more embodiments comprises: a generator; a turbine device that drives and rotates the generator; and a control device that: monitors a rotation speed of the generator; calculates a first adjusting power instruction value corresponding to a deviation between a reference value and an observed value of the rotation speed of the generator; acquires an adjusting power amplification coefficient from an external device; calculates a second adjusting power instruction value indicating a degree of increase of the adjusting power, based on the first adjusting power instruction value and the adjusting power amplification coefficient; amplifies the adjusting power based on the second adjusting power instruction value; and outputs the amplified adjusting power to the turbine device to adjust power supply from the generator and reduces fluctuation of frequency in a power transmission and distribution system.

A power source of one or more embodiments comprises: a generator; a turbine device that drives and rotates the generator; and a control device that: monitors a rotation speed of the generator; calculates a first adjusting power instruction value by multiplying, by a first proportional constant containing a predefined first droop, a deviation between a reference value and an observed value of the rotation speed of the generator; determines a second droop of the generator based on a weight coefficient corresponding to a response delay of the generator; calculates a third adjusting power instruction value indicating a degree of increase of the adjusting power by multiplying the deviation by a second proportional constant containing the second droop: amplifies the adjusting power based on the third adjusting power instruction value; and outputs the amplified adjusting power to the turbine device to adjust power supply from the generator and reduces fluctuation of frequency in a power transmission and distribution system.

An adjusting power instructing apparatus of one or more embodiments comprises: a communication interface; and a processor that: transmits, to a control device for a generator connected to a targeted power grid, via the communication interface, an instruction to increase a proportional constant of an adjusting power that the control device outputs depending on a deviation between a reference value and an observed value of a rotation speed of the generator; acquires an active power measurement value of active power exchanged at a connection point between the targeted power grid and another power grid, and a frequency measurement value of frequency at the connection point; calculates an adjusting power coefficient indicating a degree of influence that fluctuation in the active power has on fluctuation in the frequency, based on the active power measurement value and the frequency measurement value; and transmits, to the control device via the communication interface, an instruction indicating a degree of increase of the proportional constant depending on a deviation between the adjusting power coefficient and a target value of the adjusting power coefficient.

BRIEF DESCRIPTION OF DRAWINGS

FIG. 19 is a diagram illustrating example impulse responses according to one or more embodiments.

FIG. 24 is an example weight coefficient table according to one or more embodiments.

DETAILED DESCRIPTION OF EMBODIMENTS

Embodiments of the present invention will now be described herein with reference to the drawings by way of example. Those skilled in the art will recognize that many alternative embodiments can be accomplished using the teaching of the present invention and that the present invention is not limited to the embodiments illustrated herein for explanatory purposes.

Hereinafter a power supply and demand system of one or more embodiments will be described with reference to FIGS. 1-6.

(Overall Structure of Power Supply and Demand System)

Figure 1:
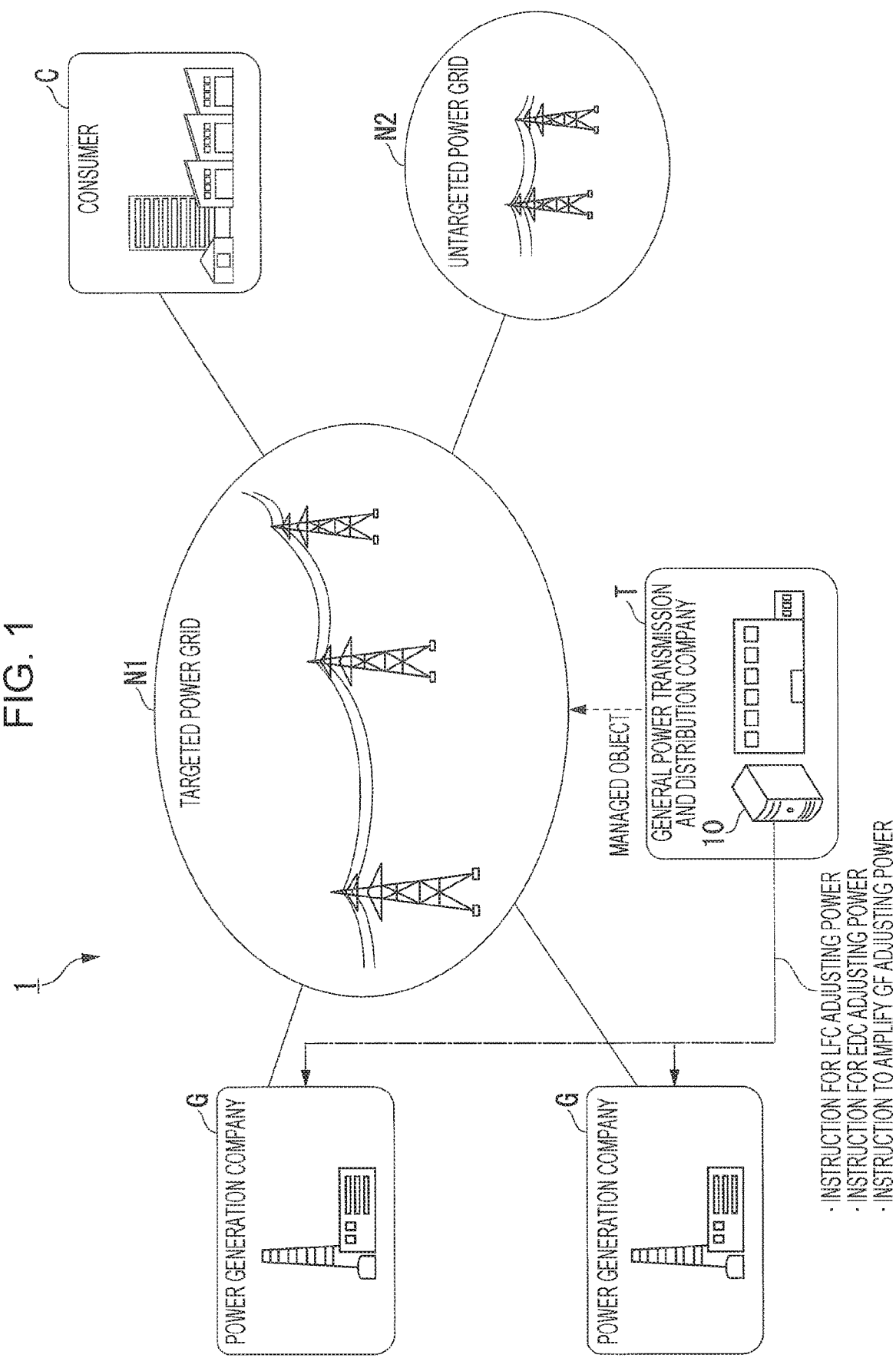
FIG. 1 is a diagram illustrating an overall structure of a power supply and demand system according to one or more embodiments.

FIG. 1 is a diagram illustrating an overall structure of a power supply and demand system according to one or more embodiments.

The power supply and demand system 1 maintains a power supply-demand balance between a power generation companies G generating power and a consumer C consuming the supplied power.

In FIG. 1, the power generation companies G and the consumer C are connected to a power grid ("targeted power grid N1") managed by a general power transmission and distribution company ("transmission and distribution company") T. The targeted power grid N1 is also connected to a power grid ("untargeted power grid N2") managed by another general power transmission and distribution company ("another transmission and distribution company").

The power generation companies G generate power using a turbine device, a generator, and the like to be described later. The power generated by the power generation companies G is supplied to the consumer C through the targeted power grid N1 managed by the transmission and distribution company T.

The consumer C is a factory or the like. The consumer C manages loads such as electric motors, and consumes the power supplied via the targeted power grid N1.

The transmission and distribution company T observes frequency of the power flowing in the targeted power grid N1, and monitors the power supply and demand balance between the power generation companies G and the consumer C. To sustain balanced supply-demand state, the transmission and distribution company T operates an adjusting power instructing apparatus 10 to transmit, to the power generation companies G, instructions to supply the adjusting power by Load Frequency Control (LFC) and/or Economic load Dispatching Control (EDC).

The power supply and demand system 1 comprises the adjusting power instructing apparatus 10.

The adjusting power instructing apparatus 10 is managed by the transmission and distribution company T. The adjusting power instructing apparatus 10 transmits the instructions ("adjusting power instruction") to supply the adjusting power by LFC and/or EDC, in response to operations by an operator of the transmission and distribution company T.

The adjusting power instructing apparatus 10 of one or more embodiments also transmits, to the power generation companies G, instructions ("GF adjusting power amplifying instruction") to amplify governor-free (GF) adjusting power.

(Detailed Structure of Power Supply and Demand System)

Figure 2:
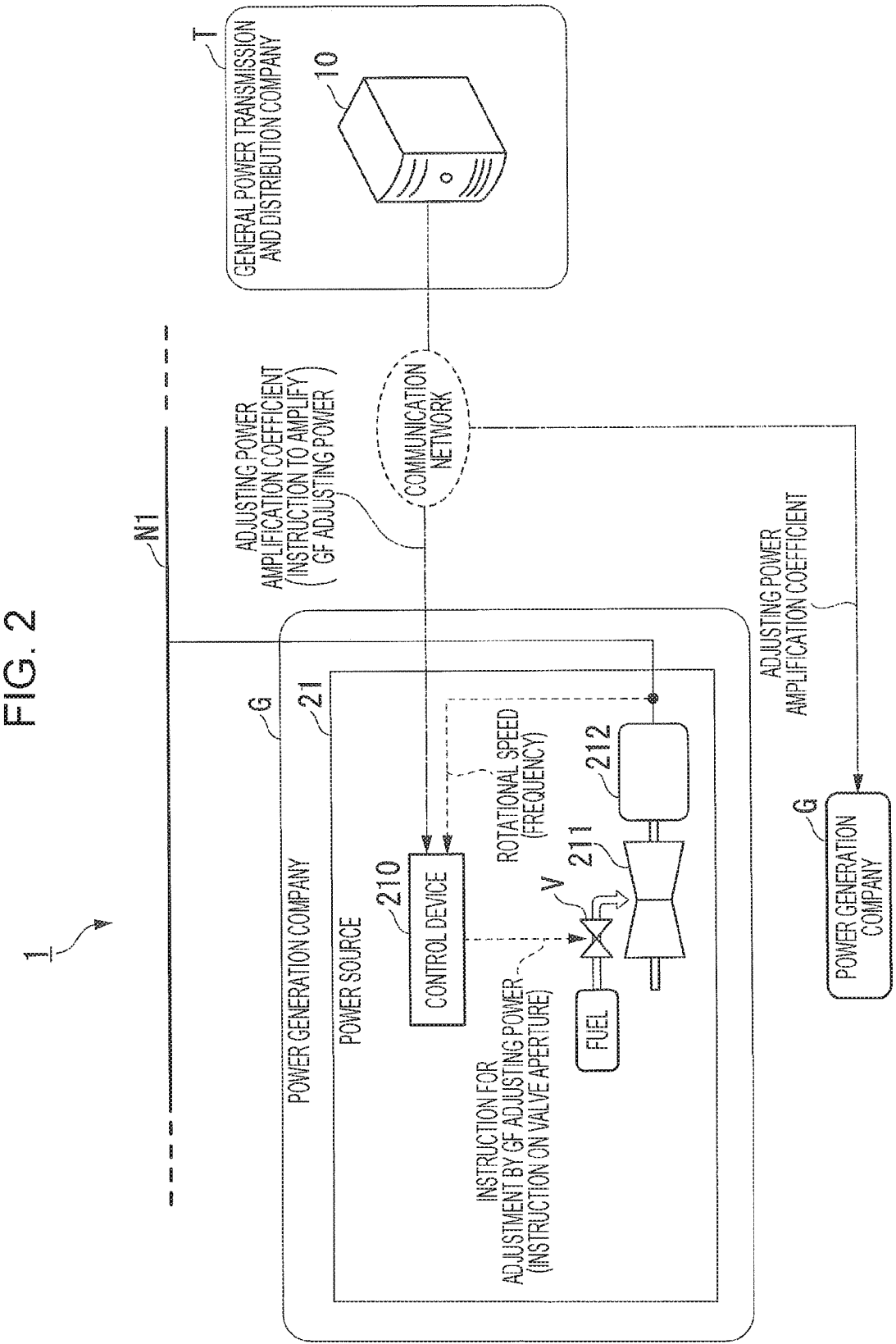
FIG. 2 is a diagram illustrating in detail the structure of the power supply and demand system according to one or more embodiments.

FIG. 2 is a diagram illustrating in detail the structure of the power supply and demand system according to one or more embodiments.

As illustrated in FIG. 2, the power generation company G manages a power source 21. Although the power generation company G manages a plurality of power sources having the same structures as that of the power source 21, illustration thereof is omitted.

The power source 21 comprises a control device 210, turbine device 211, and generator 212. The control device 210 outputs amplified adjusting power to the turbine device 211 to adjust power supply from generator 212, and reduces fluctuation of frequency in a power transmission and distribution system.

The turbine device 211 is a gas turbine, steam turbine, or the like. The turbine device 211 generates a torque corresponding to a supply amount of fuel (steam). The turbine device 211 also drives and rotates the generator 212 via a rotating shaft connected to the generator 212.

The generator 212 generates the power as a rotor is rotated by the torque input from the turbine device 211. The power generated by the generator 212 is sent out to the targeted power grid N1.

The control device 210 controls and operates the turbine device 211 and the generator 212. In one or more embodiments, the control device 210 continuously monitors the rotation speed (corresponding to frequency of output) of the generator 212, and automatically adjusts an amount of input (fuel) supplied to the turbine device 211 (GF operation) to maintain the rotation speed constant.

Specifically, the control device 210 acquires an observed value of the rotation speed from the output of the turbine device 211 or the generator 212. The control device 210 then calculates a deviation between the observed value and a predetermined reference value, and calculates output (GF adjusting power) that the generator 212 should further generate to reduce the deviation. After that, the control device 210 outputs the instruction ("GF adjusting power instruction") indicating the calculated GF adjusting power, namely, an instruction on a valve aperture, to a fuel supply valve V.

According to the above control by the control device 210, the power source 21 successively supplies the adjusting power, with GF operation, with respect to short-period (e.g., 3 to 5 seconds) demand fluctuation.

In GF operation by the control device 210, the output (i.e., adjusting power $\Delta P$) additionally generated by the power source 21 depending on the deviation (frequency deviation $\Delta f$) between the observed value of the rotation speed of the generator 212 and the reference value is defined as Formula (1) below using a permanent speed variation (droop) $\delta$.

[Formula 1]

$$\Delta P = \frac{1}{\delta} P_n \frac{\Delta f}{f_n} \quad (1)$$

In Formula (1), "$\Delta$" indicates a frequency deviation $\Delta f$ [Hz], which is a deviation between an output frequency of the power source 21 and a reference frequency (e.g., 50 Hz), "$f_n$" indicates a reference frequency (e.g., 50 Hz) of the targeted power grid N1, and "$P_n$" indicates a rated output [W] of the power source 21.

In GF operation control by the control device 210, the adjusting power $\Delta P$ that the generator 212 outputs depending on the frequency deviation $\Delta f$ is determined based on a proportional constant $(1/\delta \cdot Pn/fn)$ containing the droop $\delta$.

The adjusting power instructing apparatus 10 managed by the transmission and distribution company T transmits the GF adjusting power amplifying instruction to the control device 210 via a predetermined communication network (e.g., internet connection). In one or more embodiments, the GF adjusting power amplifying instruction is a signal indicating an "adjusting power amplification coefficient" to be described later.

(Hardware Configuration of Adjusting Power Instruction Apparatus)

Figure 3:
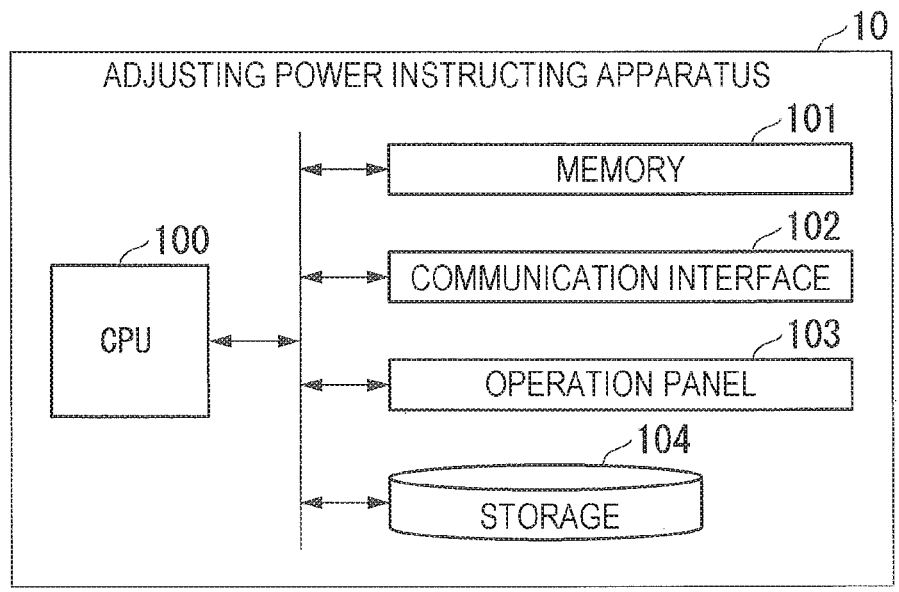
FIG. 3 is a block diagram illustrating a hardware configuration of an adjusting power instructing apparatus according to one or more embodiments.

FIG. 3 is a block diagram illustrating a hardware configuration of an adjusting power instructing apparatus according to one or more embodiments.

As illustrated in FIG. 3, the adjusting power instructing apparatus 10 comprises a CPU 100, memory 101, communication interface 102, operation panel 103, and storage 104.

The CPU 100 is a processor that controls the entire adjusting power instructing apparatus 10.

The memory 101 is a main memory, in which instructions and data for the CPU 100 to operate according to programs are expanded.

The communication interface 102 is an interface device for exchanging information with an external device/apparatus (especially the control device 210). In one or more embodiments, communication means and methods realized by the communication interface 102 are not particularly limited. For example, the communication interface 102 of one or more embodiments is a wired connection interface for realizing wired communication, or a wireless communication module for realizing wireless communication.

The operation panel 103 is an input interface including a key board and a touch sensor.

The storage 104 is an auxiliary storage device. The storage 103 of one or more embodiments is a Hard Disk Drive (HDD), Solid State Drive (SSD), or the like.

(Functional Composition of Adjusting Power Instructing Apparatus)

Figure 4:
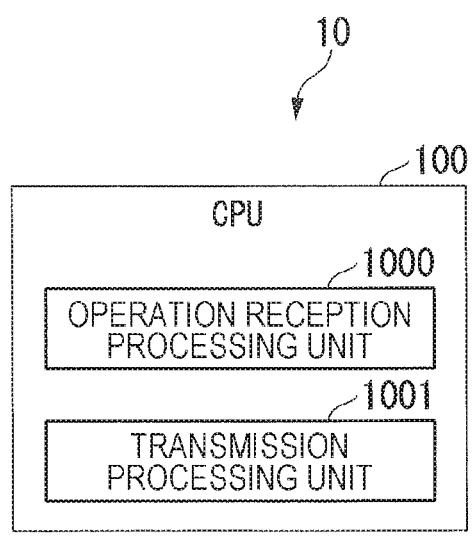
FIG. 4 is a block diagram illustrating a functional composition of the adjusting power instructing apparatus according to one or more embodiments.

FIG. 4 is a block diagram illustrating a functional composition of the adjusting power instructing apparatus according to one or more embodiments.

As illustrated in FIG. 4, the CPU 100 of the adjusting power instructing apparatus 10 operates according to programs and functions as an operation reception processing unit 1000 and a transmission processing unit 1001.

The operation reception processing unit 1000 receives operations by an operator via the operation panel 103. For example, the operation reception processing unit 1000 receives an operation to output the instruction to supply the LFC/EDC adjusting power from the operator. The operation reception processing unit 1000 also receives an instruction to output the GF adjusting power amplifying instruction from the operator.

The transmission processing unit 1001 transmits various instructions to the control device 210 of the power source 21 via the communication interface 102. In one or more embodiments, the transmission processing unit 1001 transmits the GF adjusting power amplifying instruction indicating the adjusting power amplification coefficient. The adjusting power amplification coefficient refers to a value indicating a degree of increase of a first proportional constant $(1/\delta \cdot Pn/fn)$ of the adjusting power $\Delta P$ to be output depending on the deviation (frequency deviation $\Delta f$) between the observed value of the rotation speed of the generator 212 and the reference value.

(Hardware Configuration of Control Device)

Figure 5:
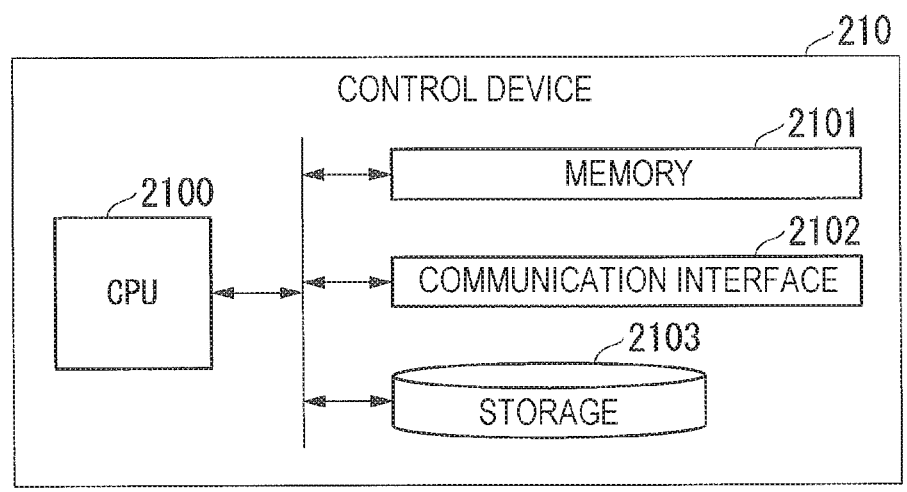
FIG. 5 is a block diagram illustrating a hardware configuration of a control device according to one or more embodiments.

FIG. 5 is a block diagram illustrating a hardware configuration of a control device according to one or more embodiments.

As illustrated in FIG. 5, the control device 210 comprises a CPU 2100, memory 2101, communication interface 2102, and storage 2103.

The CPU 2100 is a processor that controls the entire control device 210.

The memory 2101 is a main memory, in which instructions and data for the CPU 2100 to operate according to programs are expanded.

The communication interface 2102 is an interface device for exchanging information with an external device/apparatus (especially the adjusting power instructing apparatus 10).

The storage 2103 is an auxiliary storage device. The storage 103 of one or more embodiments is a Hard Disk Drive (HDD), Solid State Drive (SSD), or the like.

(Functional Composition and Processing Flow of Control Device)

Figure 6:
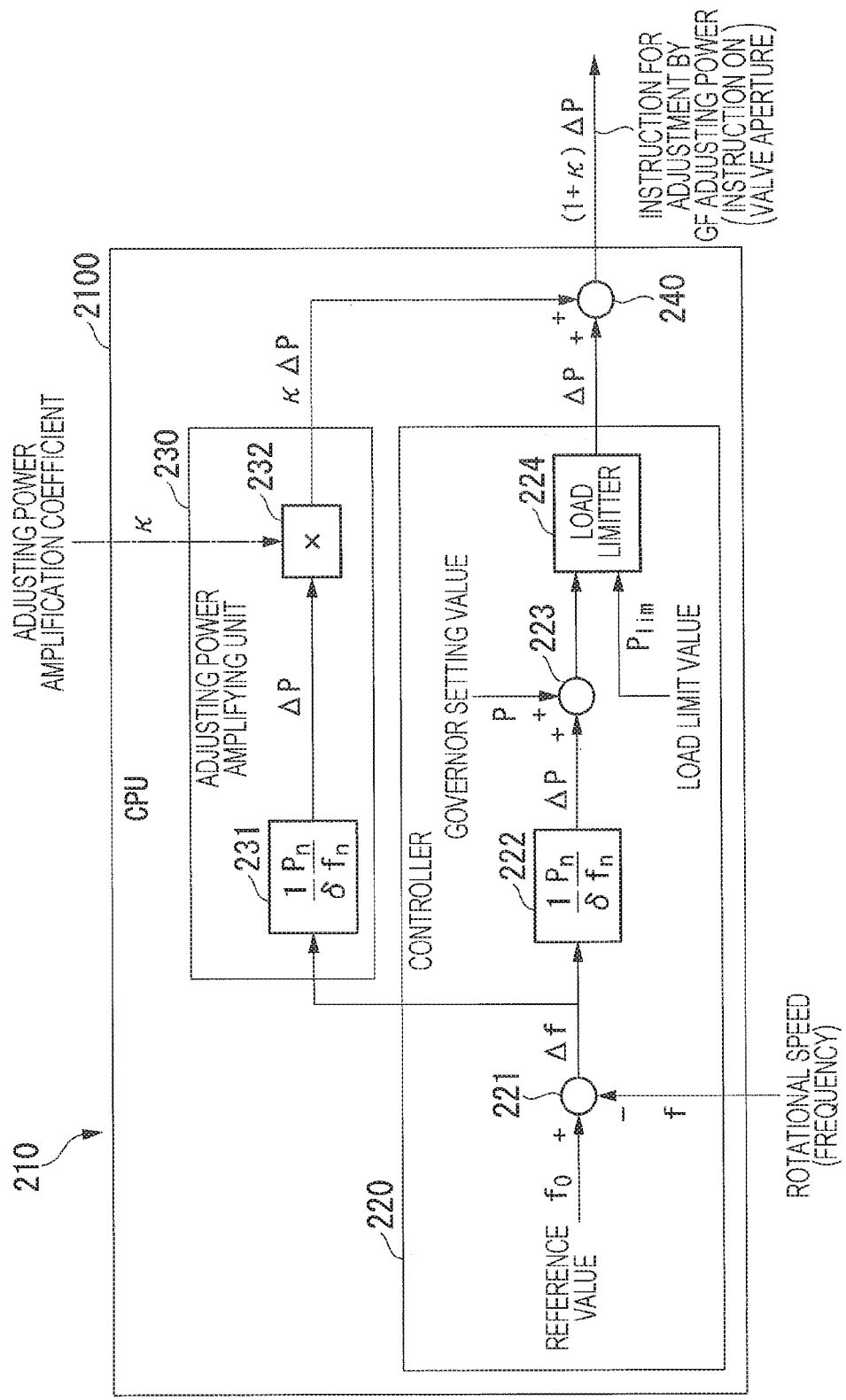
FIG. 6 is a block diagram illustrating a functional composition and a processing flow of the control device according to one or more embodiments.

FIG. 6 is a block diagram illustrating a functional composition and a processing flow of the control device according to one or more embodiments.

As illustrated in FIG. 6, the CPU 2100 of the control device 210 operates according to programs and functions as a controller 220, adjusting power amplifying unit 230, and adder 240.

The controller 220 performs control to execute GF operation. Specifically, the controller 220 (calculating unit 222) calculates a first adjusting power instruction value ($\Delta P$) by multiplying the deviation (frequency deviation $\Delta f$) between the observed value of the rotation speed of the generator 212 and the reference value by a predefined first proportional constant $(1/\delta \cdot Pn/fn)$.

The adjusting power amplifying unit 230 acquires an adjusting power amplification coefficient $\kappa$ based on the instruction from the adjusting power instructing apparatus 10. The adjusting power amplifying unit 230 then calculates a second adjusting power instruction value ($\kappa \Delta P$) by multiplying the frequency deviation $\Delta f$ by a second proportional constant $(1/\delta \cdot Pn/fn \cdot \kappa)$ corresponding to the adjusting power amplification coefficient $\kappa$.

The adder 240 calculates an amplified adjusting power instruction value $(1\kappa) \Delta P$ by adding the second adjusting power instruction value $\kappa \Delta P$ to the first adjusting power instruction value $\Delta P$.

The amplified adjusting power instruction value $(+\kappa) \Delta P$ is output, as the final GF adjusting power instruction (instruction on a valve aperture), to the fuel supply value V from the control device 210 as illustrated in FIG. 2. Thus, the control device 210 of one or more embodiments outputs the adjusting power amplified by $\kappa \Delta P$ than the general GF adjusting power instruction $\Delta P$ based on the GF adjusting power amplifying instruction received from the adjusting power instructing apparatus 10.

The flow of processing by the controller 220, the adjusting power amplifying unit 230, and the adder 240 will be described with reference to FIG. 6. In one or more embodiments, the controller 220 constitutes an individual functional block in the control device 210.

The processing by the controller 220 will be described in detail.

As illustrated in FIG. 6, a calculating unit 221 calculates the frequency deviation $\Delta f$ ($=f_0-f$), which is the deviation between the observed value (rotation speed f) of the generator 212 and the reference value $f_0$.

Then, the calculating unit 222 calculates the first adjusting power instruction value $\Delta P$ by multiplying the frequency deviation Δf by the first proportional constant (1/δ·Pn/fn) containing the droop δ. The first adjusting power instruction value ΔP is calculated based on Formula (1), and corresponds to the GF adjusting power instruction output depending on the frequency deviation Δf in general GF operation.

Next, a calculating unit (adder) 223 adds a predefined governor setting value P to the first adjusting power instruction value ΔP calculated by the calculating unit 222.

After that, a load limiter 224 determines whether a sum (P+ΔP) of the governor setting value P and the first adjusting power instruction value ΔP exceeds a predefined load limit value $P_{lim}$. If the sum (P+ΔP) exceeds the load limit value $P_{lim}$, the load limiter 224 applies a limit to the first adjusting power instruction value ΔP not to exceed the load limit value $P_{lim}$.

The function of the load limiter 224 will be described.

It is assumed that the governor setting value P is set to 100% and the load limit value $P_{lim}$ is set to 110% in a presetting processing of the control device 210. In this case, the first adjusting power instruction value ΔP output from the controller 220 is limited to be within a range of 10% by the load limiter 224.

Meanwhile, it is assumed that the governor setting value P is set to 100% and the load limit value $P_{lim}$ is set to 100% (or less than 100%) in advance. In this case, the first adjusting power instruction value ΔP output from the controller 220 always becomes 0%. Such a setting gives the same result as in the case GF operation by the control device 210 is set to "OFF."

The processing by the adjusting power amplifying unit 230 will be described in detail.

As illustrated in FIG. 6, a calculating unit 231 calculates the first adjusting power instruction value ΔP by multiplying the frequency deviation Δf by the first proportional constant (1/δ·Pn/fn).

Then a multiplier 232 receives the adjusting power amplification coefficient κ from the adjusting power instruction apparatus 10, and multiplies the first adjusting power instruction value ΔP calculated by the calculating unit 231 by the adjusting power amplification coefficient κ to obtain the second adjusting power instruction value κΔP.

In other words, the adjusting power amplifying unit 230 acquires the adjusting power amplification coefficient κ based on the instruction from the adjusting power instruction apparatus 10, and calculates the second adjusting power instruction value κΔP by multiplying the frequency deviation Δf by the second proportional constant (1/δ—Pn/fn·κ) corresponding to the adjusting power amplification coefficient κ.

The processing by the adder 240 will be described in detail.

The adder 240 adds the second adjusting power instruction value κΔP to the first adjusting power instruction value ΔP to obtain the amplified adjusting power instruction value (1+κ)ΔP. The adder 240 then outputs, as the final GF adjusting power instruction, the amplified adjusting power instruction value (1+κ) ΔP to the fuel supply valve V illustrated in FIG. 2. In one or more embodiments, the controller 220 constitutes the individual functional block as described above. If the interior of the controller 220 is allowed to be changed, the calculating unit 223 can execute the above function instead of the adder 240.

In summary, the CPU 2100 increases, by the second proportional constant (1/δ·Pn/fn·κ) based on the GF adjusting power amplifying instruction, the first proportional constant (1/δ·Pn/fn) determining the adjusting power ΔP that the generator 212 should output depending on the frequency deviation Δf, and then executes GF operation.

Although illustration is omitted in FIG. 6, the CPU 2100 of the control device 210 receives the instruction to supply the LFC/EDC adjusting power as necessary, in addition to the GF adjusting power amplifying instruction (adjusting power amplification coefficient κ), from the adjusting power instructing apparatus 10. The CPU 2100 actually controls the turbine device 211 and the generator 212 based on not only the GF adjusting power instruction obtained based on the GF adjusting power amplifying instruction (adjusting power amplification coefficient κ), but also the instruction to supply the LFC/EDC adjusting power.

As described above, in one or more embodiments, the control device 210 controlling the turbine device 211 and the generator 212 outputs the amplified adjusting power instruction value (1+κ) ΔP, which is larger than the adjusting power instruction value (first adjusting power instruction value ΔP) output in general GF operation, in response to the instruction from the adjusting power instructing apparatus 10. The adjusting power amplification coefficient κ includes a value in minus. Therefore, the amplified adjusting power instruction value (1+κ) ΔP is sometimes smaller than the adjusting power instruction value (first adjusting power instruction value ΔP).

The adjusting power instructing apparatus 10 transmits the GF adjusting power amplifying instruction for increasing the proportional constant of the adjusting power output depending on the deviation (frequency deviation Δf) between the observed value of the rotation speed of the generator 212 and the reference value, to the control device 210 of the generator 212 connected to the targeted power grid N1 as a managed object.

By this operation, if the adjusting power for short-period demand fluctuation is insufficient, an operator of the transmission and distribution company T can flexibly procure the GF adjusting power by transmitting the GF adjusting power amplifying instruction to the power generation companies G.

(Variations of One or More Embodiments)

Figure 7:
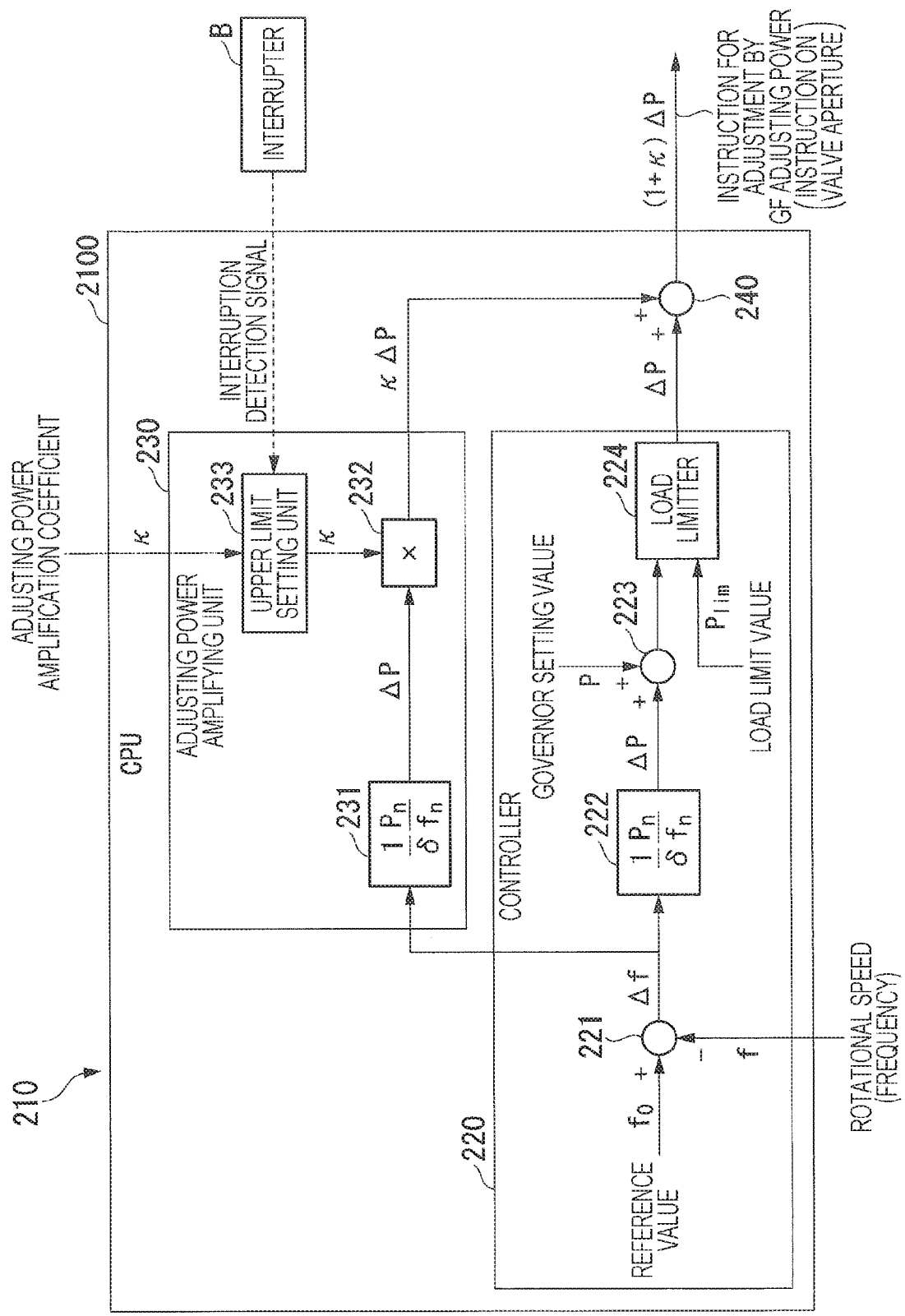
FIG. 7 is a block diagram illustrating a functional composition and a processing flow of the control device according to variations of one or more embodiments.

FIG. 7 is a block diagram illustrating a functional composition and a processing flow of the control device according to variations of one or more embodiments.

The adjusting power amplifying unit 230 of variations of one or more embodiments additionally comprises an upper limit setting unit 233.

The upper limit setting unit 233 applies a predefined upper limit value to the adjusting power amplification coefficient κ received from the adjusting power instructing apparatus 10, and outputs the result. By this operation, the adjusting power amplifying unit 230 can amplify the adjusting power within a range not exceeding the limit of the power source 21 (turbine device 211, generator 212) even when receiving the adjusting power amplification coefficient κ having a considerably high value from the adjusting power instructing apparatus 10.

In one or more embodiments, the upper limit setting unit 233 receives an interruption detection signal from an interrupter B. The interrupter B interrupts electrical connection between the generator 212 and the targeted power grid N1 so that the generator 212 is disconnected.

The upper limit setting unit 233 sets the upper limit value to zero (0) immediately after receiving the interruption detection signal from the interrupter B. After this setting, the upper limit setting unit 233 always outputs zero (0) regardless of the adjusting power amplification coefficient κ received from the adjusting power instructing apparatus 10.

The droop δ applied to general GF operation control is set to a value that does not cause hunting (vibration) of GF operation control even when the generator 212 is in a no-load state (disconnected state). However, when the generator 212 is disconnected (becomes the no-load state), if GF operation is performed by the proportional constant (to which the second proportional constant is added) larger than the first proportional constant based on the droop δ, by the adjusting power amplifying unit 230, the proportional constant (proportional gain) with respect to the load might become too large to cause hunting.

For this reason, the adjusting power amplifying unit 230 of the variations sets the adjusting power amplification coefficient κ to zero (0) immediately after detecting disconnection of the generator 212 to invalidate the function of the upper limit setting unit 233. This can prevent the hunting in GF operation control from occurring when the generator 212 is disconnected.

Although the adjusting power amplifying unit 230 of the variations sets the adjusting power amplification coefficient κ to zero (0) when the generator 212 is disconnected, the present invention is not limited thereto. In one or more embodiments, the adjusting power amplifying unit 230 reduces the adjusting power amplification coefficient κ within a range where the hunting of the generator 212 can be prevented, when detecting the disconnection of the generator 212.

Next, the power supply and demand system according to one or more embodiments will be described with reference to FIGS. 8 and 9.

(Detailed Structure of Power Supply and Demand System)

Figure 8:
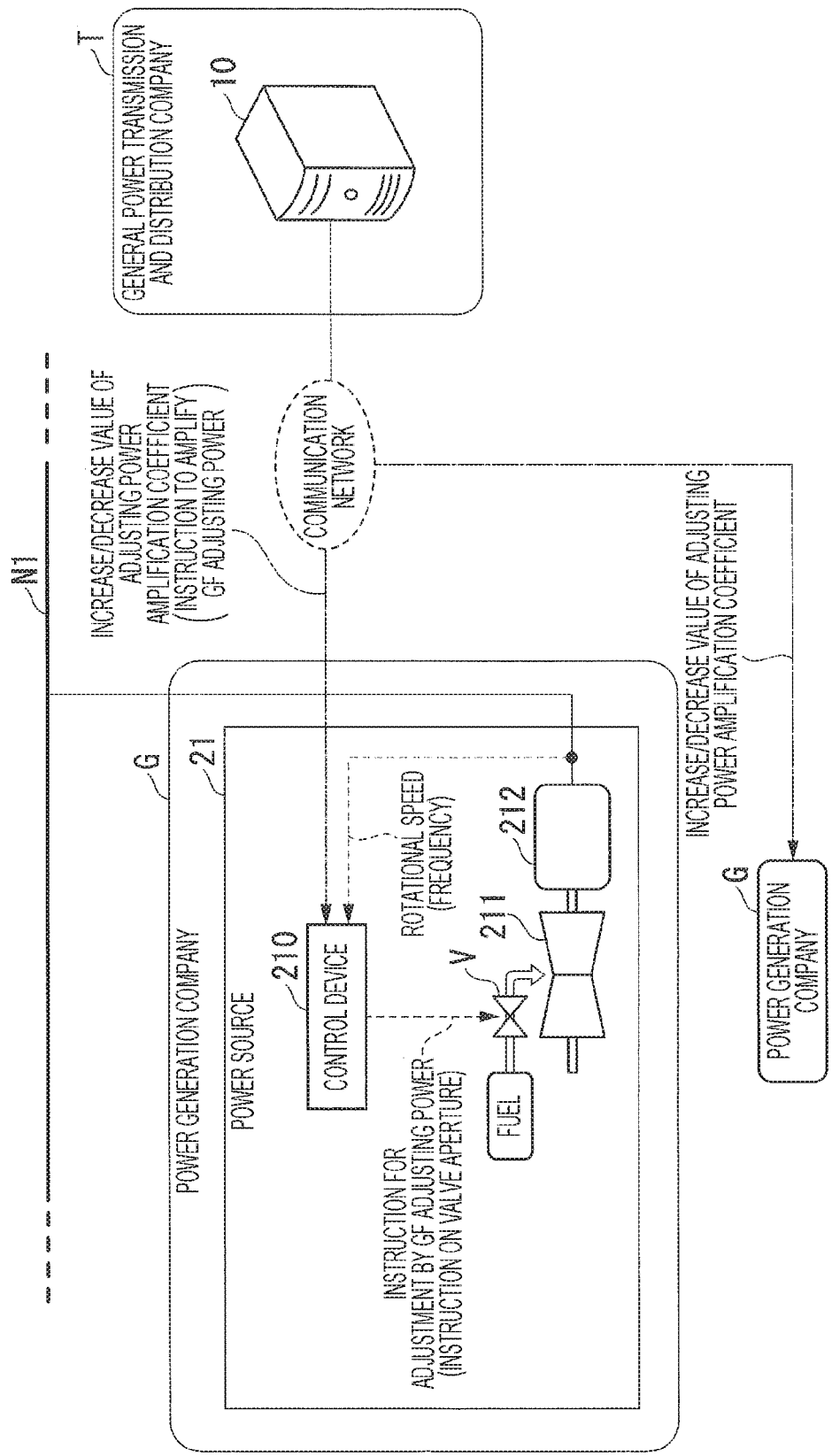
FIG. 8 is a diagram illustrating in detail a structure of the power supply and demand system according to one or more embodiments.

FIG. 8 is a diagram illustrating in detail a structure of the power supply and demand system according to one or more embodiments.

As illustrated in FIG. 8, the adjusting power instructing apparatus 10 of one or more embodiments outputs, as the GF adjusting power amplifying instruction, an "increase/decrease value (adjustment value) of adjusting power amplification coefficient" to the control device 210. The increase/decrease value of adjusting power amplification coefficient indicates a degree of increase/decrease of the adjusting power amplification coefficient κ applied to each of the power generation companies G.

(Functional Composition and Processing Flow of Control Device)

Figure 9:
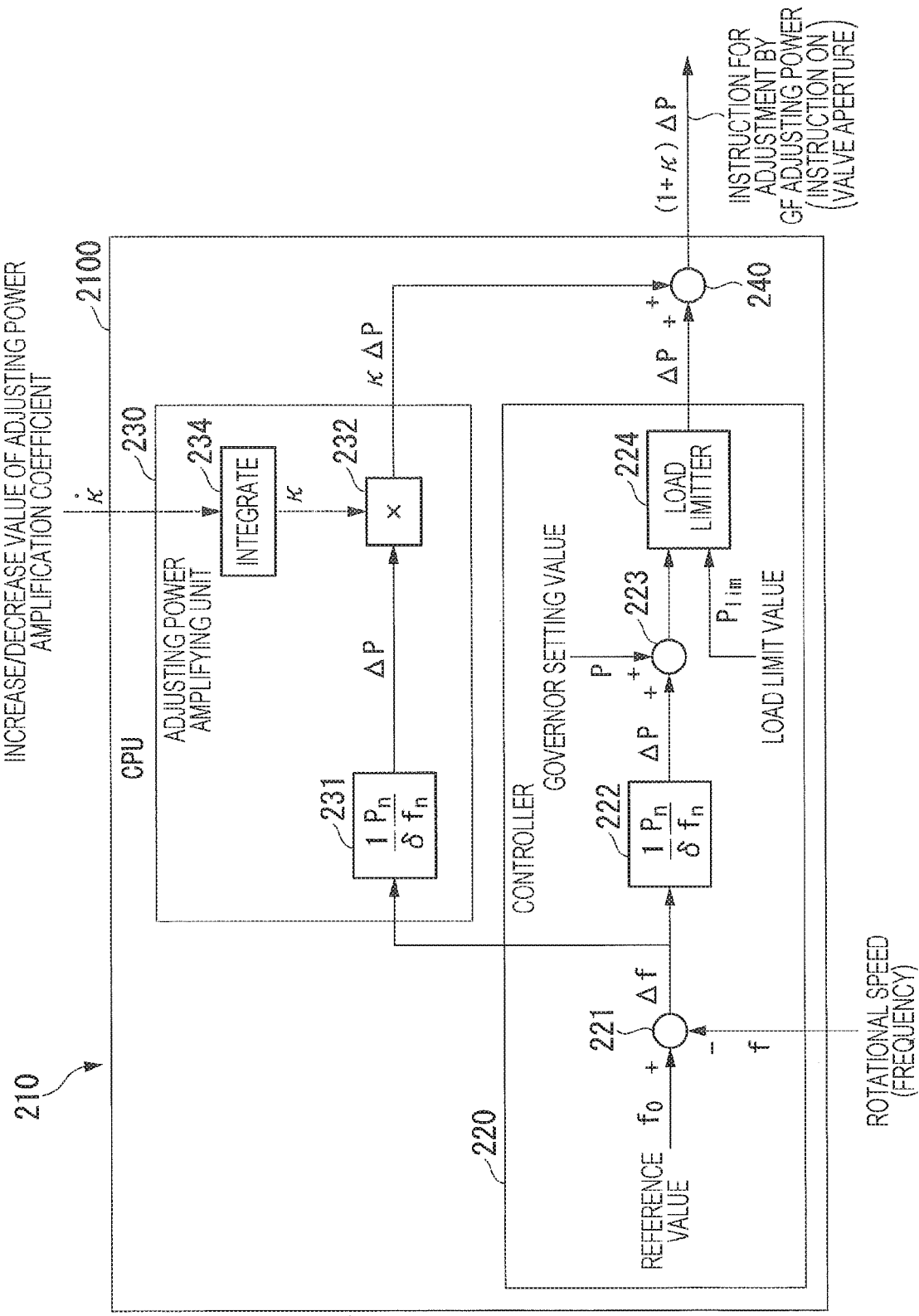
FIG. 9 is a block diagram illustrating a functional composition and a processing flow of the control device according to one or more embodiments.

FIG. 9 is a block diagram illustrating a functional composition and a processing flow of the control device according to one or more embodiments.

As illustrated in FIG. 9, the adjusting power amplifying unit 230 of one or more embodiments further comprises an integrator 234.

The integrator 234 receives, as the GF adjusting power amplifying instruction, an increase/decrease value κ• of adjusting power amplification coefficient κ (adjustment value κ• for increasing or decreasing the adjusting power amplification coefficient κ) from the adjusting power instructing apparatus 10. The integrator 234 then time-integrates the increase/decrease value κ• to obtain the adjusting power amplification coefficient κ. After that, the integrator 234 outputs the adjusting power amplification coefficient κ calculated by time integration to the multiplier 232.

According to the structure of one or more embodiments, the transmission and distribution company T merely instructs to increase or decrease the adjusting power amplification coefficient κ, instead of transmitting the adjusting power amplification coefficient κ itself, to the power generation companies G. As a result, an operator of the transmission and distribution company T has only to instruct to increase or decrease the adjusting power amplification coefficient κ depending on a determination result about excess/deficiency of the GF adjusting power against short-period demand fluctuation. This can simplify adjustment of the power supply-demand balance.

A power supply and demand system of one or more embodiments will be described with reference to FIG. 10.

(Functional Composition and Processing Flow of Control Device)

Figure 10:
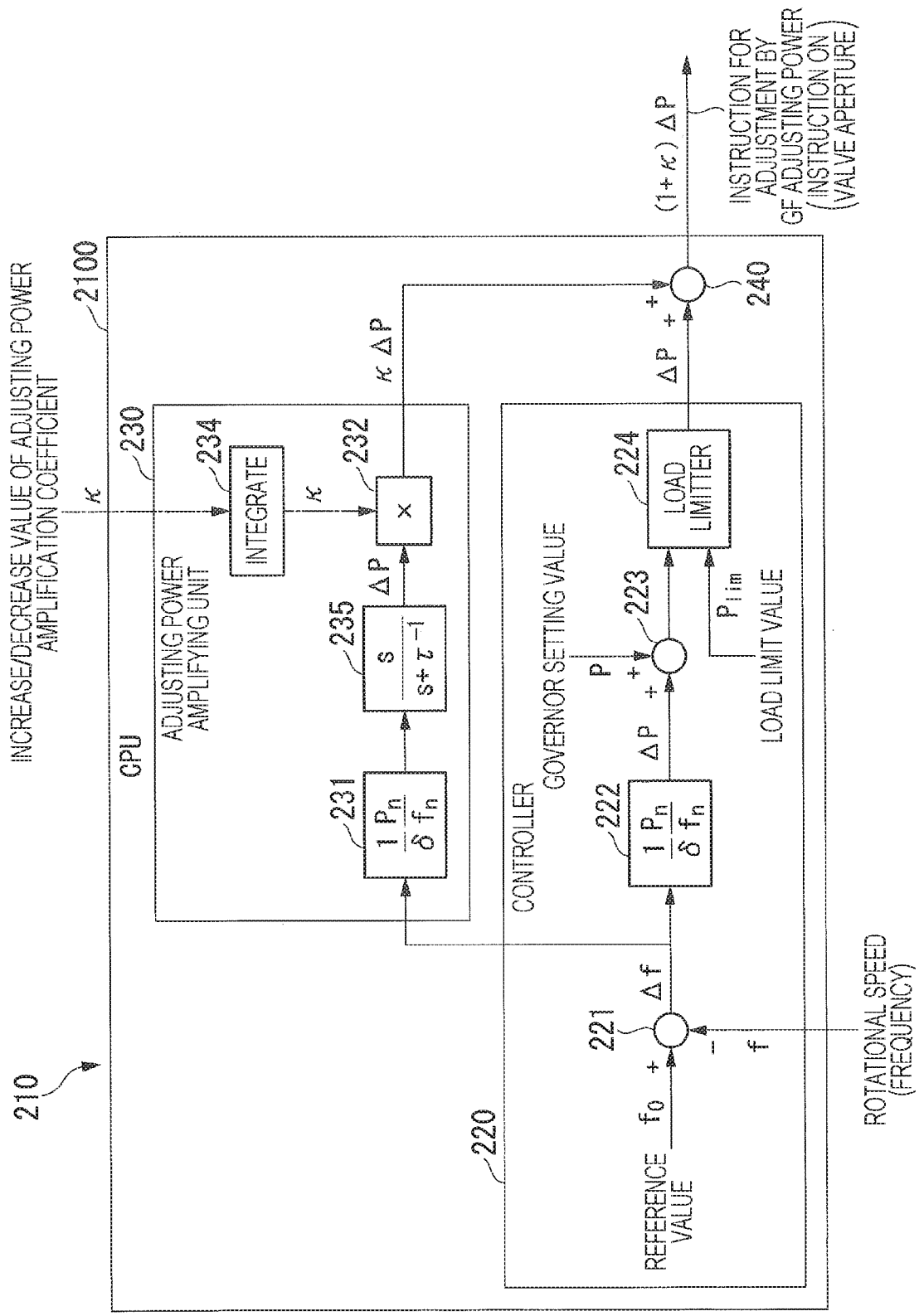
FIG. 10 is a block diagram illustrating a functional composition and a processing flow of the control device according to one or more embodiments.

FIG. 10 is a block diagram illustrating a functional composition and a processing flow of the control device according to one or more embodiments.

As illustrated in FIG. 10, the adjusting power amplifying unit 230 of one or more embodiments further comprises a low-frequency cutoff filter 235.

The low-frequency cutoff filter 235 is disposed between the calculating unit 231 and the multiplier 232, and cuts off a low frequency band of the first adjusting power instruction value ΔP (i.e., frequency deviation Δf). A time constant r of the low-frequency cutoff filter 235 can be set depending on a frequency band to be cut off.

The GF adjusting power is supplied to deal with short-period demand fluctuation, but the LFC/EDC adjusting power should be supplied to deal with the situation where the frequency deviation Δf continuously occurs. By disposing the low-frequency cutoff filter 235, the GF adjusting power to which the GF adjusting power amplifying instruction is applied can deal with only short-period demand fluctuation.

(Variations of One or More Embodiments)

Figure 11:
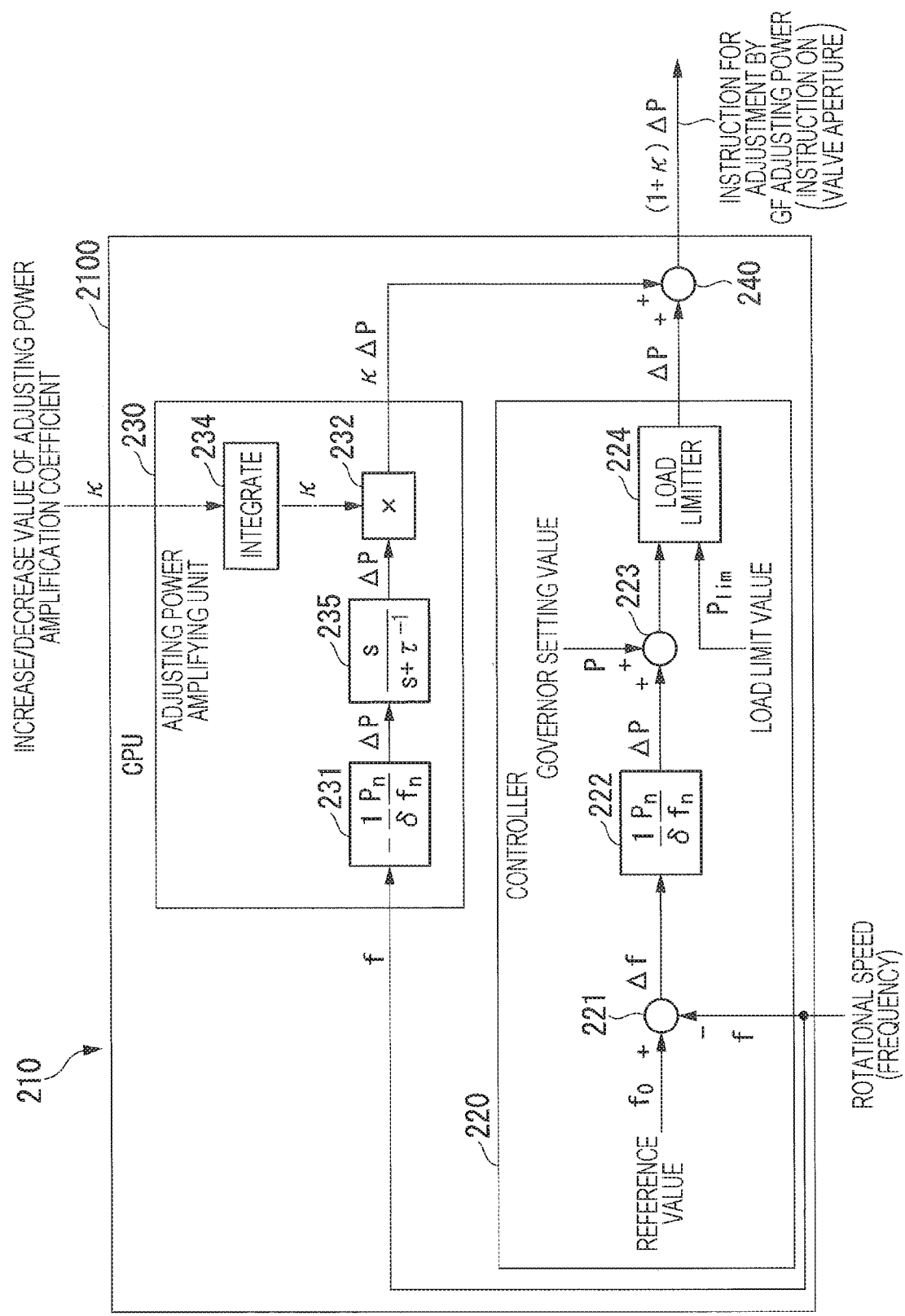
FIG. 11 is a block diagram illustrating a functional composition and a processing flow of the control device according to variations of one or more embodiments.

FIG. 11 is a block diagram illustrating a functional composition and a processing flow of the control device according to variations of one or more embodiments.

The adjusting power amplifying unit 230 of variations of one or more embodiments comprises the low-frequency cutoff filter 235 as with the aforementioned embodiments (FIG. 10). In addition, the adjusting power amplifying unit 230 of the variations directly receives the observed value (rotation speed f) of the rotation speed of the generator 212, unlike the aforementioned embodiments.

The calculating unit 231 of the variations multiplies the rotation speed f by a negative first proportional constant (−1/δ·Pn/fn), unlike the aforementioned embodiments.

Even when the rotation speed f of the generator 212 is directly input to the calculating unit 231, the low-frequency cutoff filter 235 cuts off components based on a reference value $f_0$ as a fixed value. The output value from the low-frequency cutoff filter 235 becomes the first adjusting power instruction value ΔP after the low-frequency band components are cut off, as with the aforementioned embodiments.

As a result, the overall structure is simplified compared with the aforementioned embodiments.

A power supply and demand system of one or more embodiments will be described with reference to FIGS. 12-14.

(Overall Structure of Power Supply and Demand System)

Figure 12:
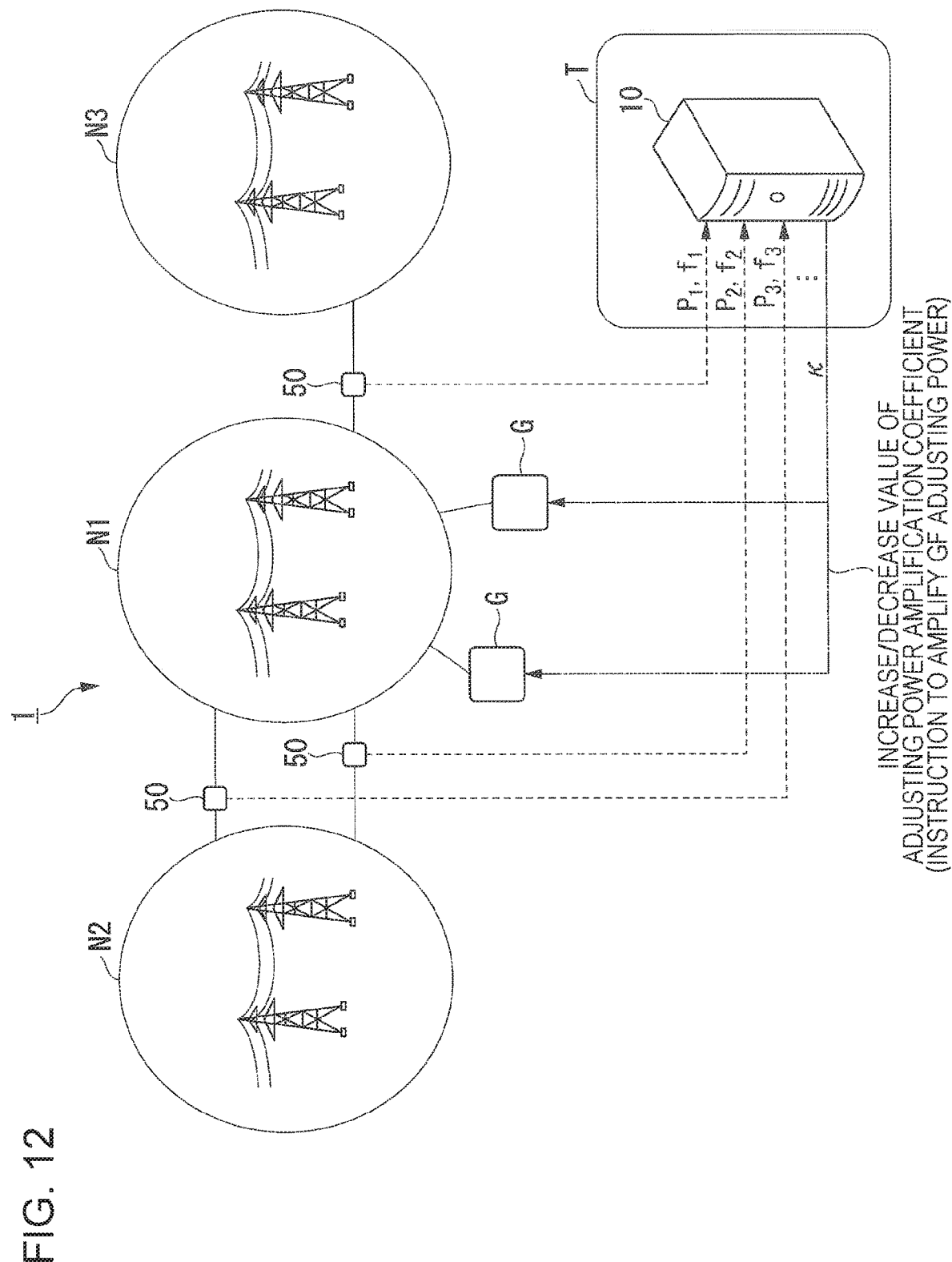
FIG. 12 is a diagram illustrating an overall structure of the power supply and demand system according to one or more embodiments.

FIG. 12 is a diagram illustrating an overall structure of the power supply and demand system according to one or more embodiments.

FIG. 12 illustrates, in addition to the targeted power grid N1, untargeted power grids N2, N3 managed by other transmission and distribution companies, respectively. As illustrated in FIG. 12, the targeted power grid N1 is electrically connected to the untargeted power grids N2, N3 at one or more connection points, and constitutes a large-scale power transmission and distribution system.

In the power supply and demand system 1 of one or more embodiments, measurement instruments 50 are installed at the connection points between the targeted power grid N1 and the untargeted power grids N2, N3. The measurement instruments 50 are capable of measuring the active power (power flow) exchanged at the connection points and the frequency at the connection points. The measurement instruments 50 measure, as the "positive" active power, the active power flowing from the targeted power grid N1 into the untargeted power grids N2, N3.

The measurement instruments 50 of one or more embodiments may be a general power meter with a frequency measurement function.

The adjusting power instructing apparatus 10 of one or more embodiments receives measurement results (active power measurement values $P_1$, $P_2$, etc., and frequency measurement values $f_1$, $f_2$, etc.) of the active power and the frequency from the measurement instruments 50. The adjusting power instructing apparatus 10 transmits the appropriate increase/decrease value of the adjusting power amplification coefficient (GF adjusting power amplifying instruction) depending on the measurement results by the measurement instruments 50, to the power generation companies G connected to the targeted power grid N1.

(Functional Composition of Adjusting Power Instructing Apparatus)

Figure 13:
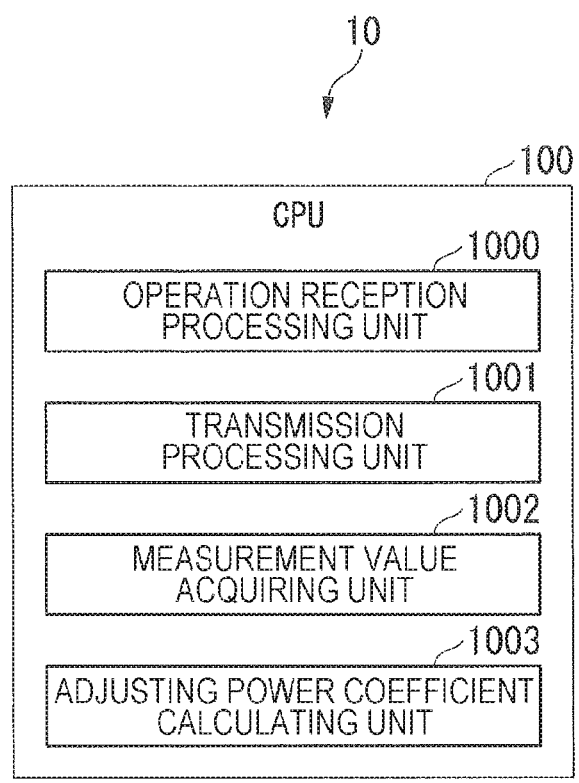
FIG. 13 is a block diagram illustrating a functional composition of the adjusting power instructing apparatus according to one or more embodiments.

FIG. 13 is a block diagram illustrating a functional composition of the adjusting power instructing apparatus according to one or more embodiments.

As the hardware configuration of the adjusting power instructing apparatus is same as that of the aforementioned embodiments (FIG. 3), illustration thereof is omitted.

As illustrated in FIG. 13, the CPU 100 of the adjusting power instructing apparatus 10 operates according to programs, and functions as an operation reception processing unit 1000, transmission processing unit 1001, measurement value acquiring unit 1002, and adjusting power coefficient calculating unit 1003.

The operation reception processing unit 1000 has the same function as that of the aforementioned embodiments.

The measurement value acquiring unit 1002 receives the measurement results (active power measurement values $P_1$, $P_2$, etc., and frequency measurement values $f_1$, $f_2$, etc.) of the active power and the frequency from the measurement instruments 50 (FIG. 12).

The adjusting power coefficient calculating unit 1003 calculates an adjusting power coefficient $k_p$ based on the active power measurement values $P_1$, $P_2$, etc. and the frequency measurement values $f_1$, $f_2$, etc. acquired by the measurement value acquiring unit 1002. The adjusting power coefficient $k_p$ is a value indicating a degree of influence (contribution) that fluctuation in the active power exchanged at the connection points between the targeted power grid N1 and the untargeted power grids N2, N3 has on fluctuation in the frequency.

The transmission processing unit 1001 of one or more embodiments transmits, to the power generation companies G, the GF adjusting power amplifying instruction depending on the deviation between the adjusting power coefficient $k_p$ calculated by the adjusting power coefficient calculating unit 1003 and a target value $k_p R$ of the adjusting power coefficient $k_p$.

(Functional Composition and Processing Flow of Adjusting Power Instructing Apparatus)

Figure 14:
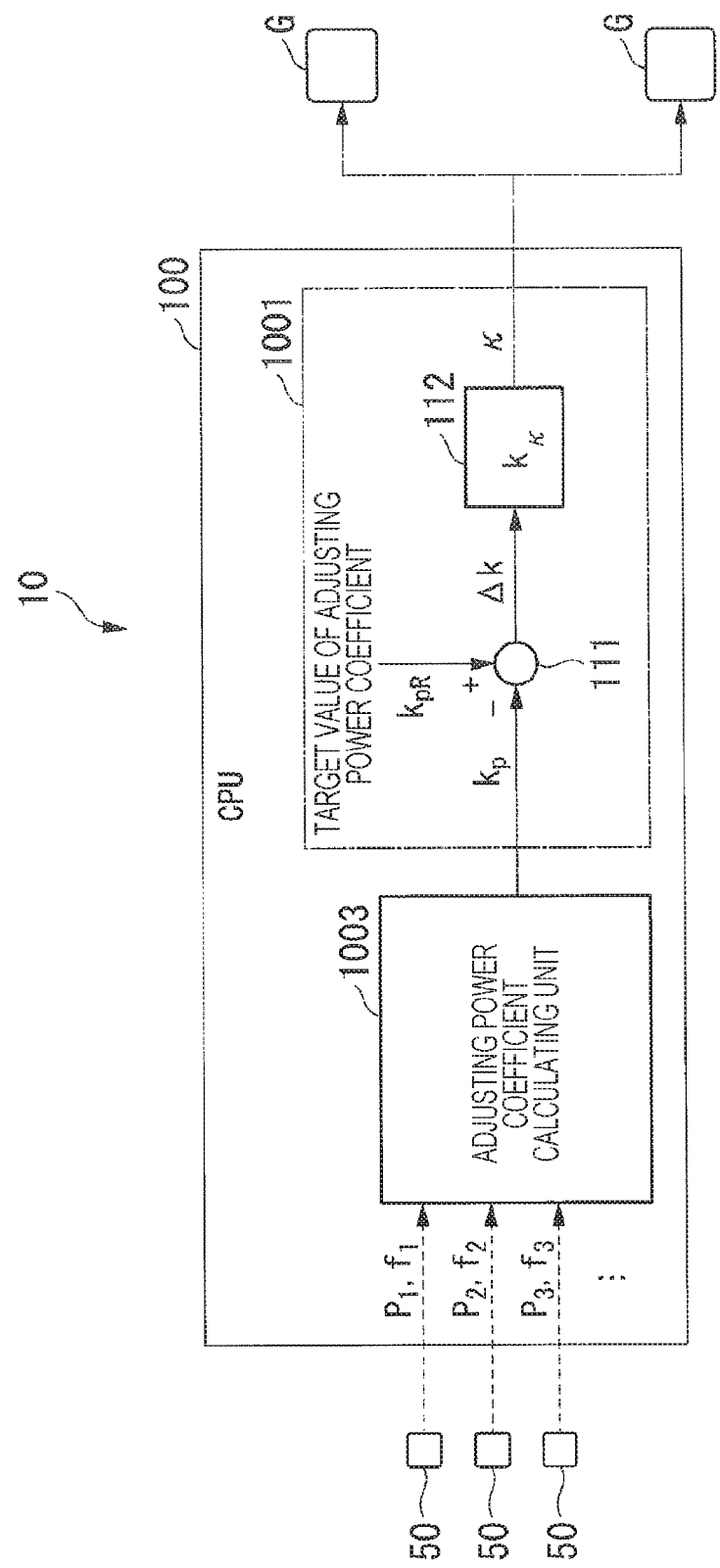
FIG. 14 is a block diagram illustrating a functional composition and a processing flow of the adjusting power instructing apparatus according to one or more embodiments.

FIG. 14 is a block diagram illustrating a functional composition and a processing flow of the adjusting power instructing apparatus according to one or more embodiments.

The flow of processing executed by the CPU 100 will be described with reference to FIG. 14.

The adjusting power coefficient calculating unit 1003 of the CPU 100 acquires the active power measurement values $P_1$, $P_2$, etc. and the frequency measurement values $f_1$, $f_2$, etc. at the connection points, respectively, via the measurement instruments 50 and the measurement value acquiring unit 1002 (FIG. 13). The adjusting power coefficient calculating unit 1003 then calculates Formula (2).

[Formula 2]

$$k_p = \frac{\int \sum_i \Delta P_i(t) \Delta f_i(t) dt}{\int \sum_i \Delta f_i(t)^2 dt} \quad (2)$$

In Formula (2), "$\Delta P_i$ (t)" (i=1, 2, etc.) indicates an active power fluctuation measurement value, and "$\Delta f_i$ (t)" indicates a frequency fluctuation measurement value. The active power fluctuation measurement value $\Delta P_i$ (t) and the frequency fluctuation measurement value $\Delta f_i$ (t) are obtained by calculating Formula (3) and Formula (4) using the active power measurement values $P_i$ (t) and the frequency measurement values $f_i$ (t), respectively.

[Formula 3]

$$\Delta P_i(t) = P_i(t) - E[P_i] \quad (3)$$

[Formula 4]

$$\Delta f_i(t) = f_i(t) - E[f_i] \quad (4)$$

In Formula (3). "E [$P_i$]" indicates an average value of the active power measurement values $P_i$ (t) respectively acquired at each time "t" in the past within a predetermined time period (e.g., 30 minutes) from the current time. The adjusting power coefficient calculating unit 1003 obtains, as the active power fluctuation measurement value $\Delta P_i$ (t), a deviation between the average value E [$P_i$] of the active power measurement values $P_i$ (t) acquired within the predetermined time period and a newly-acquired active power measurement value $P_i$ (t).

In Formula (4), "E [$f_i$]" indicates an average value of the frequency measurement values $f_i$ (t) respectively acquired at each time "t" in the past within a predetermined time period (e.g., 30 minutes) from the current time. The adjusting power coefficient calculating unit 1003 obtains, as the frequency fluctuation measurement value $\Delta f_i$ (t), a deviation between the average value E [$f_i$] of the frequency measurement values $f_i$ (t) acquired within the predetermined time period and a newly-acquired frequency measurement value $f_i$ (t).

The adjusting power coefficient $k_p$ [W/Hz] acquired by Formula (2) is an average value of amounts each indicating to what extent the frequency fluctuation at the connection point is influenced by the fluctuation in the active power measured at the connection point between the targeted power grid N1 and the untargeted power grids N2, N3. When the adjusting power coefficient $k_p$ is large, the active power fluctuation (the adjusting power) occurring correspondingly to the frequency fluctuation is large, and the sufficient adjusting power is applied to the targeted power grid N1. When the adjusting power coefficient $k_p$ is small, the sufficient adjusting power is not applied to the targeted power grid N1.

A calculating unit 111 of the transmission processing unit 1001 calculates a deviation $\Delta k$ between a predefined target value $k_p$ R of the adjusting power coefficient $k_p$ and the adjusting power coefficient $k_p$.

Then, a calculating unit 112 of the transmission processing unit 1001 calculates the increase/decrease value κ• of the adjusting power amplification coefficient κ by multiplying the deviation $\Delta k$ by a predetermined proportional constant kκ.

The transmission processing unit 1001 transmits the power amplification coefficient κ• to the power generation companies G.

As described above, the adjusting power instructing apparatus 10 of one or more embodiments transmits, to the power generation companies G, the GF adjusting power amplifying instruction indicating the degree of increase of the proportional constant (1/δ·Pn/fn) that depends on the deviation between the adjusting power coefficient $k_p$ and the target value $k_p$ R of the adjusting power coefficient $k_p$ and is used in GF operation.

As a result, the adjusting power amplification coefficient κ applied to each of the power generation companies G is automatically set so that the adjusting power coefficient $k_p$ measured via the measurement instrument 50 coincides with the predefined target value $k_p$ R of the adjusting power coefficient $k_p$.

A power supply and demand system according to one or more embodiments will be described with reference to FIGS. 15-16.

(Overall Structure of Power Supply and Demand System)

Figure 15:
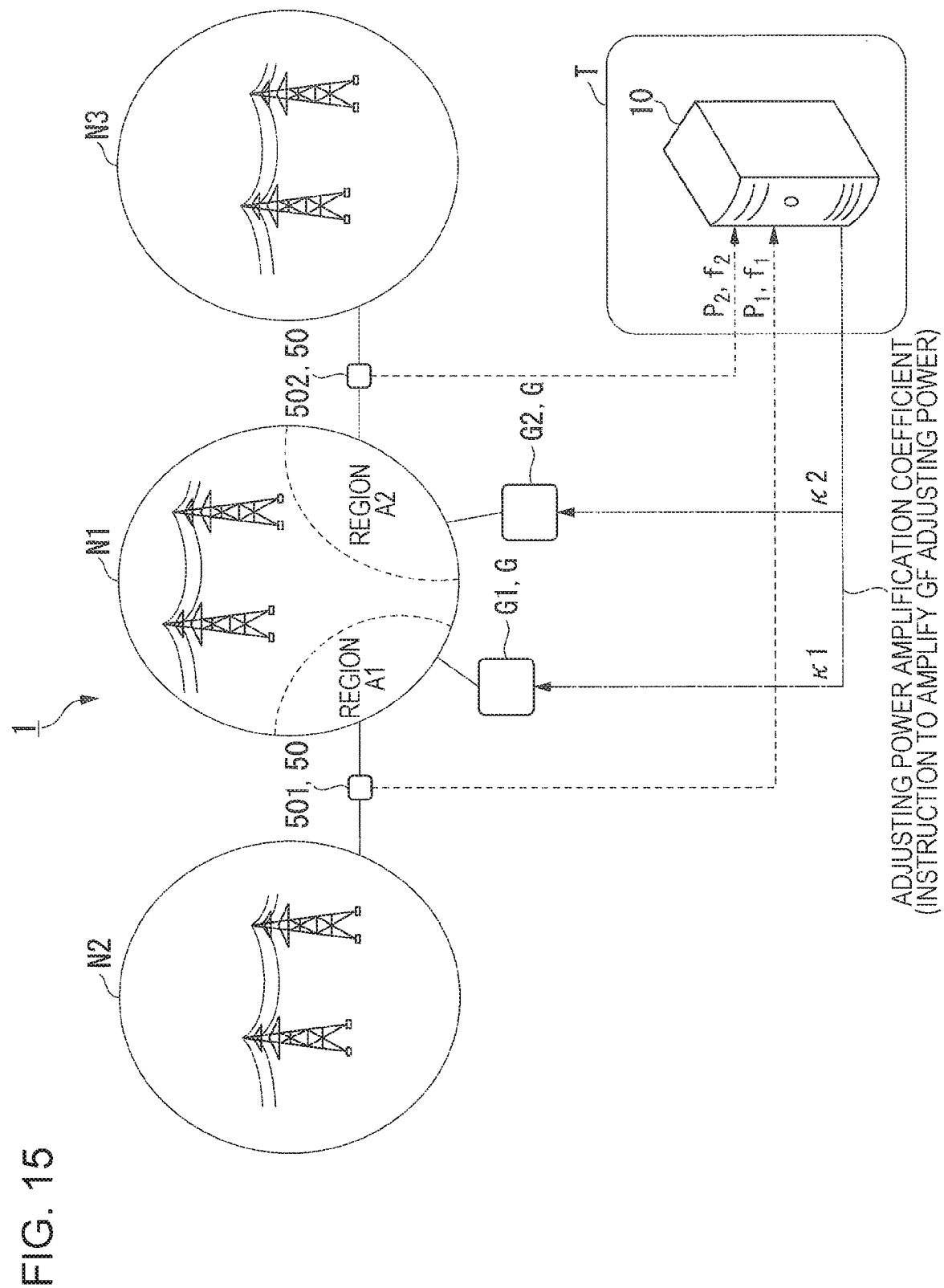
FIG. 15 is a diagram illustrating an overall structure of the power supply and demand system according to one or more embodiments.

FIG. 15 is a diagram illustrating an overall structure of the power supply and demand system according to one or more embodiments.

FIG. 15 illustrates, in addition to the targeted power grid N1, the untargeted power grids N2, N3 managed by other transmission and distribution companies. As illustrated, the targeted power grid N1 is electrically connected to the untargeted power grids N2, N3 at one or more connection points.

The targeted power grid N1 of one or more embodiments comprises a plurality of regions A1, A2, etc. having the connection points as base points, respectively. In FIG. 15, region A1 is defined within the targeted power grid N1, and has, as the base point, the connection point (at which the measurement instrument 501 is installed) between the targeted power grid N1 and the untargeted power grid N2. The power generation company G1 belongs to the region A1. Moreover, region A2 is defined within the targeted power grid N1, and has, as the base point, the connection point (at which the measurement instrument 502 is installed) between the targeted power grid N and the untargeted power grid N3. The power generation company G2 belongs to the region A2.

The adjusting power instructing apparatus 10 of one or more embodiments receives the measurement results (active power measurement values $P_1$, $P_2$, etc., and frequency measurement values $f_1$, $f_2$, etc.) of the active power and the frequency from the measurement instruments 50. The adjusting power instructing apparatus 10 then transmits the appropriate adjusting power amplification coefficient κ1 (GF adjusting power amplifying instruction), based on the active power measurement value $P_1$ and the frequency measurement value $f_1$ received from the measurement instrument 501 belonging to the region A1, to the power generation company G1 belonging to the region A1. The adjusting power instructing apparatus 10 also transmits the appropriate adjusting power amplification coefficient κ2 (GF adjusting power amplifying instruction), based on the active power measurement value $P_2$ and the frequency measurement value $f_2$ received from the measurement instrument 502 belonging to the region A2, to the power generation company G2 belonging to the region A2.

(Functional Composition and Processing Flow of Adjusting Power Instructing Apparatus)

Figure 16:
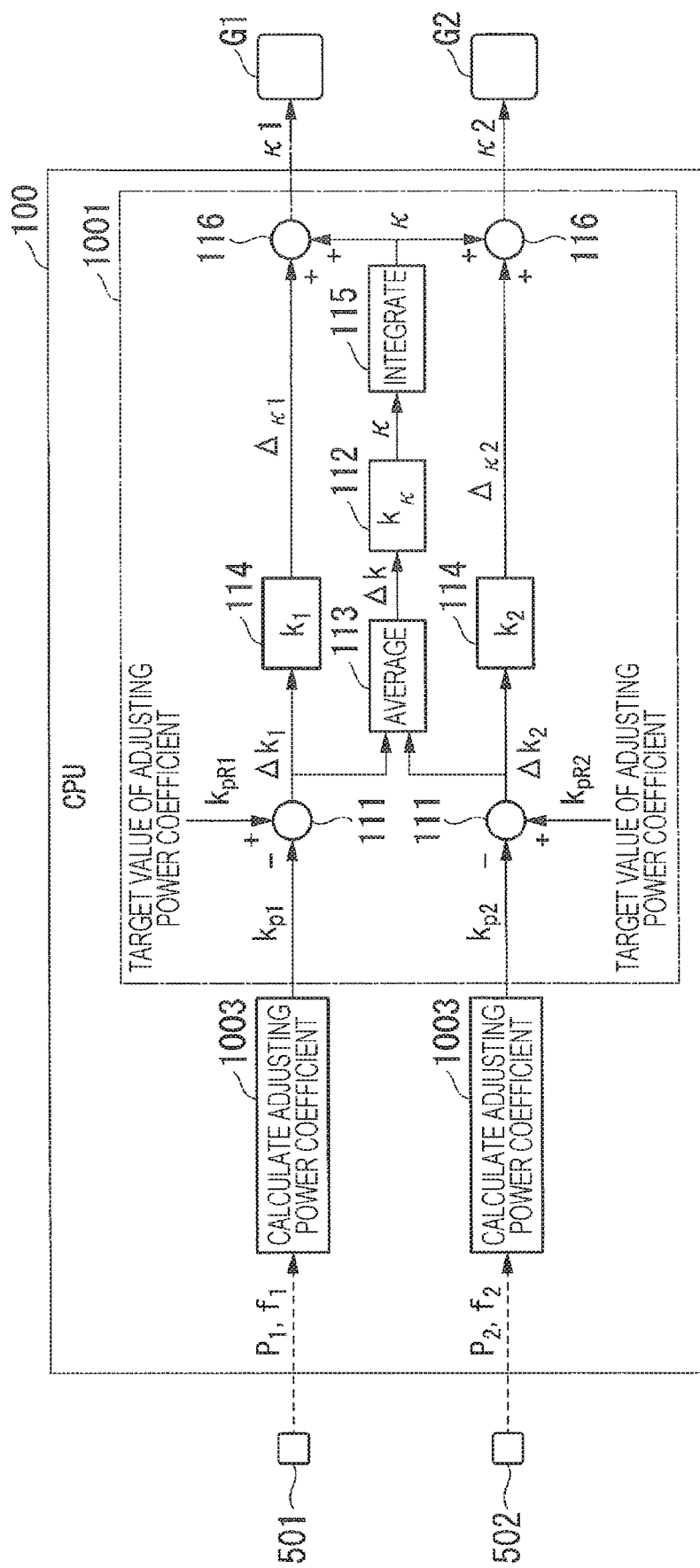
FIG. 16 is a block diagram illustrating a functional composition and a processing flow of the adjusting power instructing apparatus according to one or more embodiments.

FIG. 16 is a block diagram illustrating a functional composition and a processing flow of the adjusting power instructing apparatus according to one or more embodiments.

The flow of processing executed by the CPU 100 will be described with reference to FIG. 16.

A first and second adjusting power coefficient calculating units 1003 acquire the active power measurement values $P_1$, $P_2$, etc. and the frequency measurement values $f_1$, $f_2$, etc. at the connection points, respectively, via the measurement instruments 50 and the measurement value acquiring unit 1002 (FIG. 13).

The first adjusting power coefficient calculating unit 1003 calculates Formula (5) using the active power measurement value $P_1$ and the frequency measurement value $f_1$ acquired from the measurement instrument 501 belonging to the region A1 to obtain the adjusting power coefficient $k_{p1}$.

[Formula 5]

$$k_{p1} = \frac{\int \Delta P_1(t) \Delta f_1(t) dt}{\int \Delta f_1(t)^2 dt} \quad (5)$$

The second adjusting power coefficient calculating unit 1003 executes calculation similar to Formula (5) using the active power measurement value $P_2$ and the frequency measurement value $f_2$ acquired from the measurement instrument 502 belonging to the region A2 to obtain the adjusting power coefficient $k_{p2}$.

Then a first calculating unit 111 of the transmission processing unit 1001 calculates a deviation $\Delta k_1$ between a predefined target value $k_p$ $R_1$ of the adjusting power coefficient $k_{p1}$ and the adjusting power coefficient $k_{p1}$. A second calculating unit 111 calculates a deviation $\Delta k_2$ between a predefined target value $k_p$ $R_2$ of the adjusting power coefficient $k_{p2}$ and the adjusting power coefficient $k_{p2}$.

An average calculating unit 113 of the transmission processing unit 1001 calculates an average value $\Delta k$ between the deviation $\Delta k_1$ and the deviation $\Delta k_2$.

Then, a calculating unit 112 of the transmission processing unit 1001 calculates the increase/decrease value of the adjusting power amplification coefficient κ• by multiplying the average value $\Delta k$ between the deviation $\Delta k_1$ and the deviation $\Delta k_2$ by the predetermined proportional constant kκ.

An integrator 115 of the transmission processing unit 1001 time-integrates the increase/decrease value of adjusting power amplification coefficient κ• to obtain the adjusting power amplification coefficient κ.

A first calculating unit 114 of the transmission processing unit 1001 calculates an incremental adjusting power amplification coefficient $\Delta κ_1$ regarding region A1 by multiplying the deviation $\Delta k_1$ by the proportional constant $k_1$. A second calculating unit 114 also calculates an incremental adjusting power amplification coefficient $\Delta\kappa_2$ regarding region A2 by multiplying the deviation $\Delta k_2$ by the proportional constant $k_2$.

A first calculating unit (adder) 116 of the transmission processing unit 1001 adds the incremental adjusting power amplification coefficient $\Delta\kappa_1$ regarding region A1 to the adjusting power amplification coefficient $\kappa$ calculated based on the average value $\Delta k$ to obtain the adjusting power amplification coefficient $\kappa_1$ regarding region A1. The transmission processing unit 1001 transmits the adjusting power amplification coefficient $\kappa_1$ to the power generation company G1 belonging to the region A1.

A second calculating unit 116 (adder) adds the incremental adjusting power amplification coefficient $\Delta\kappa_2$ regarding region A2 to the adjusting power amplification coefficient $\kappa$ calculated based on the average value $\Delta k$ to obtain the adjusting power amplification coefficient $\kappa_2$ regarding region A2 by. The transmission processing unit 1001 transmits the adjusting power amplification coefficient $\kappa_2$ to the power generation company G2 belonging to the region A2.

As described above, the adjusting power instructing apparatus 10 of one or more embodiments transmits the GF adjusting power amplifying instructions depending on the deviations between the adjusting power coefficients regarding some regions (e.g., region A1) within the targeted power grid N1 and the target values of the adjusting power coefficients regarding the regions, to the control devices 210 of the generators 212 belonging to the regions, respectively.

According to the above structure, the following effects are obtained.

The adjusting power coefficient $k_{p1}$ at the connection point (the measurement instrument 501) between the targeted power grid N1 and the untargeted power grid N2 would have a different value from the adjusting power coefficient $k_{p2}$ at the connection point (the measurement instrument 502) between the targeted power grid N1 and the untargeted power grid N3.

The adjusting power instructing apparatus 10 of one or more embodiments calculates the adjusting power coefficient $k_{p1}$, $k_{p2}$ at the connection points, respectively, based on the frequencies f and the active powers P measured at the connection points. Then, the adjusting power instructing apparatus 10 sends the adjusting power amplification coefficients $\kappa_1$, $\kappa_2$ different from each other, as instructions, to the power plant groups belonging to the regions determined for the connection points, respectively. As a result, the adjusting power instructing apparatus 10 can finely send the most suitable GF adjusting power amplifying instructions (adjusting power amplification coefficients $\kappa$) to the regions containing the connection points as base points, respectively.

In one or more embodiments, the predetermined regions (regions A1, A2) in the vicinity of the connection points are defined in view of a range of a magnitude of impedance, rather than a range of a distance on a map.

A power supply and demand system according to one or more embodiments will be described with reference to FIGS. 17-19.

(Detailed Structure of Power Supply and Demand System)

Figure 17:
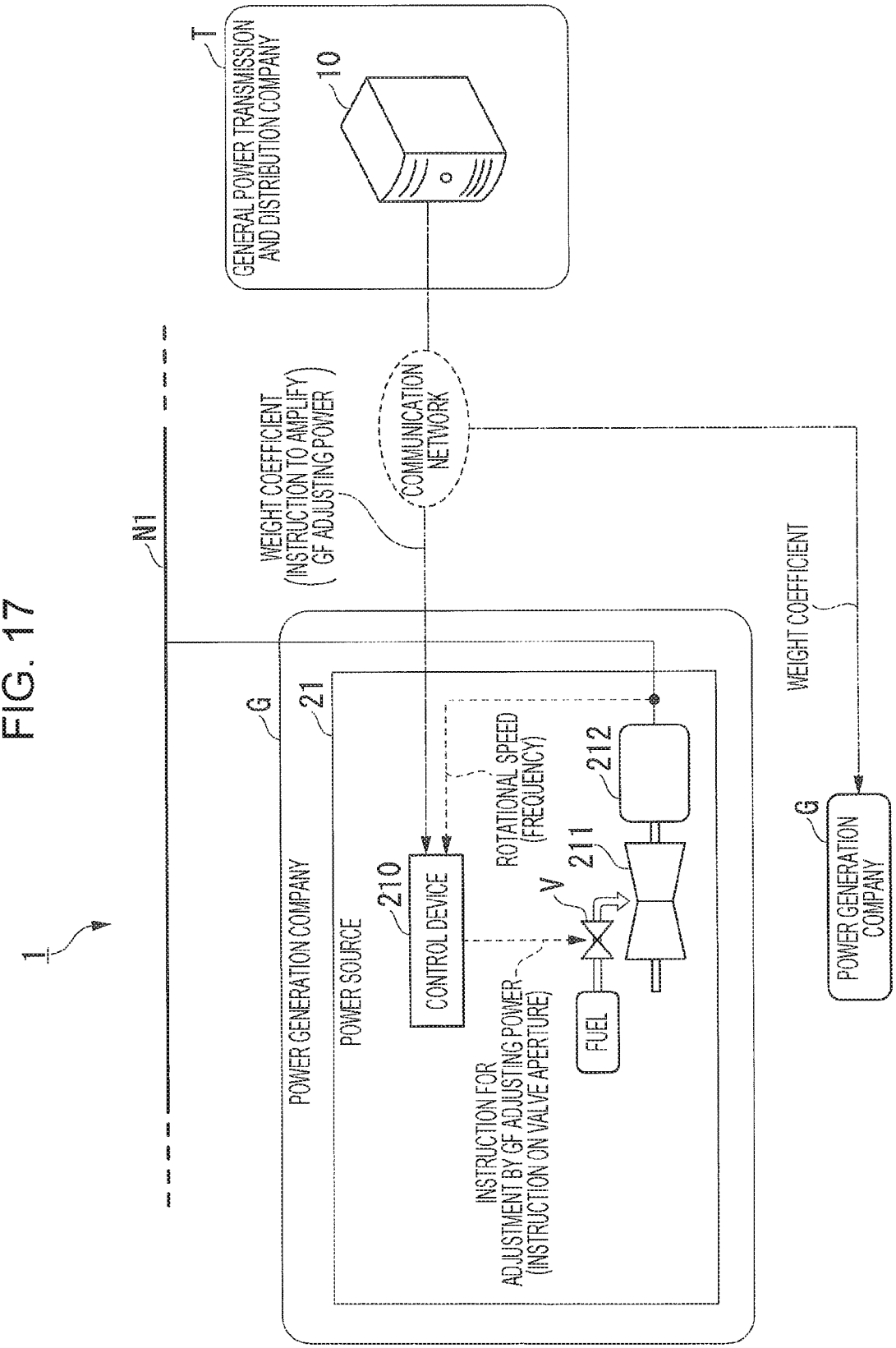
FIG. 17 is a diagram illustrating in detail the structure of the power supply and demand system according to one or more embodiments.

FIG. 17 is a diagram illustrating in detail the structure of the power supply and demand system according to one or more embodiments.

In the power supply and demand system 1 of the aforementioned embodiments, when the GF adjusting power is in short supply with respect to short-period demand fluctuation, the adjusting power instructing apparatus 10 outputs "the adjusting power amplification coefficient" or "the increase/decrease value of the adjusting power amplification coefficient" as the GF adjusting power amplifying instruction, to the power generation companies G, to amplify the GF adjusting power of the power generation companies G. In other words, according to the aforementioned embodiments, the transmission and distribution company T can directly adjust the magnitude of the GF adjusting power of the power generation companies G as necessary.

On the other hand, the power supply and demand system 1 of one or more embodiments does not cause the transmission and distribution company T to send an instruction to amplify the GF adjusting power every time, but enables the power generation companies G to autonomously adjust the magnitude of the GF adjusting power.

Specifically, as illustrated in FIG. 17, the adjusting power instructing apparatus 10 of one or more embodiments outputs "weight coefficient (w)" as the GF adjusting power amplifying instruction. The weight coefficient w adjusts the GF adjusting power depending on the delay of the response (supply of the GF adjusting power) by the generator 212 with respect to the frequency fluctuation. The weight coefficient w is an indirect GF adjusting power amplifying instruction for urging the power generation companies G to autonomously increase or decrease the GF adjusting power.

For example, when the frequency of the targeted power grid N1 lowers, positive active power is required as the GF adjusting power to maintain the frequency. If the power source 21 responds (supplies the positive active power) without delay from a point of time when the frequency lowers, this is effective and valuable for suppressing the frequency fluctuation in the targeted power grid N1. However, if the power source 21 responds with long delay (e.g., delay of 1 hour) from the point of time when the frequency lowers, there is a possibility that a degree of influence to suppression of the frequency fluctuation is low. Thus, high responsiveness of the power source 21 is important for maintaining the frequency of the targeted power gird N1 in some cases. The transmission and distribution company T of one or more embodiments sets the weight coefficients w so as to raise the value of the GF adjusting power supplied from the power source 21 that responds to the frequency fluctuation without delay. Specifically, the transmission and distribution company T sets the weight coefficient w for each point (e.g., each second) in delay time so that the weight coefficient w has a greater value as the delay time is small. The weight coefficients w set in this way are previously stored in the storage 104 of the adjusting power instructing apparatus 10.

The weight coefficients w are not limited to those of the aforementioned embodiments. In one or more embodiments, the transmission and distribution company T can arbitrarily set the weight coefficient w for each point in the delay time.

The calculating method of the GF adjusting power to be subjected to payment of compensation will be described.

It is assumed that the frequency f (t) [Hz] and the active power P (t) [W] of the power source 21 at time t are measured every predetermined sampling interval dt. Formula (6) and Formula (7) are calculated to obtain the frequency fluctuation measurement value df (t) indicating increment/decrement between the sampled frequencies f (t), and the active power fluctuation measurement value dP (t) indicating increment/decrement between the sampled active powers P (t).

[Formula 6]

$$df(t)=f(t)-f(t-dt) \tag{6}$$

[Formula 7]

$$dP(t)=P(t)-P(t-dt) \tag{7}$$

Then, Formula (8) is calculated to obtain the GF adjusting power ($dP_{GFl1}$).

[Formula 8]

$$dP_{GFl1}(t)=-\text{sign}(df(t) \cdot dP(t)) \cdot |dP(t)| \tag{8}$$

If "df (t)·dP (t)," which is obtained by multiplying the frequency fluctuation measurement value df (t) by the active power fluctuation measurement value dP (t), has a negative value, it means that the active power has been supplied in a direction opposite to increase or decrease of the frequency. In this case, as the active power is supplied in a direction cancelling the frequency fluctuation, "df (t)·dP (t)" is counted as the positive adjusting power. If "df (t)·dP (t)" has a positive value, it is counted as the negative adjusting power.

Actually, a delay occurs in a response (generated power output) from the power source 21. For example, the increase of the generated power output (active power) does not occur simultaneously with the decrease of the frequency, and occurs with delay from the time point of the decrease of the frequency. As described above, the adjusting power is valuable as the delay of the generated power output (increase of generated power) is small. For this reason, the response of the power source 21 with respect to the frequency fluctuation measurement value df (t) at time t is calculated by convolution by weighting and averaging, with the weight coefficient w (t), a time-series signal during a time period from time t to a time point in the past. Specifically, Formula (9) is calculated to obtain the response at time t.

[Formula 9]

$$dP_w(t) = \sum_{n \in \{0,1,2,...\}} w(n \cdot dt) dP(t + n \cdot dt) \tag{9}$$

Formula (9) can be simplified with symbol "*" of the convolution as Formula (10) below.

[Formula 10]

$$dP_w = w*dP \tag{10}$$

Formula (8) is rewritten using Formula (10), and the GF adjusting power $dP_{GFl1}$ including the delay time of the response by the power source 21 is calculated. Specifically, Formula (11) is calculated to obtain the GF adjusting power $dP_{GFl1}$.

[Formula 11]

$$dP_{GFl1}(t)=-\text{sign}(df(t) \cdot df_w(t)) \cdot |dP_w(t)| \tag{11}$$

The GF adjusting power $dP_{GFl1}$ can also be expressed by Formula (12) utilizing commutation law of the convolution.

[Formula 12]

$$dP_{GFl1}(t)=-\text{sign}(df_w(t) \cdot dP(t)) \cdot |dP(t)| \tag{12}$$

The "$df_w$" in Formula (12) is calculated using Formula (13) below.

[Formula 13]

$$df_w = w*df \tag{13}$$

(Functional Composition and Processing Flow of Control Device)

Figure 18:
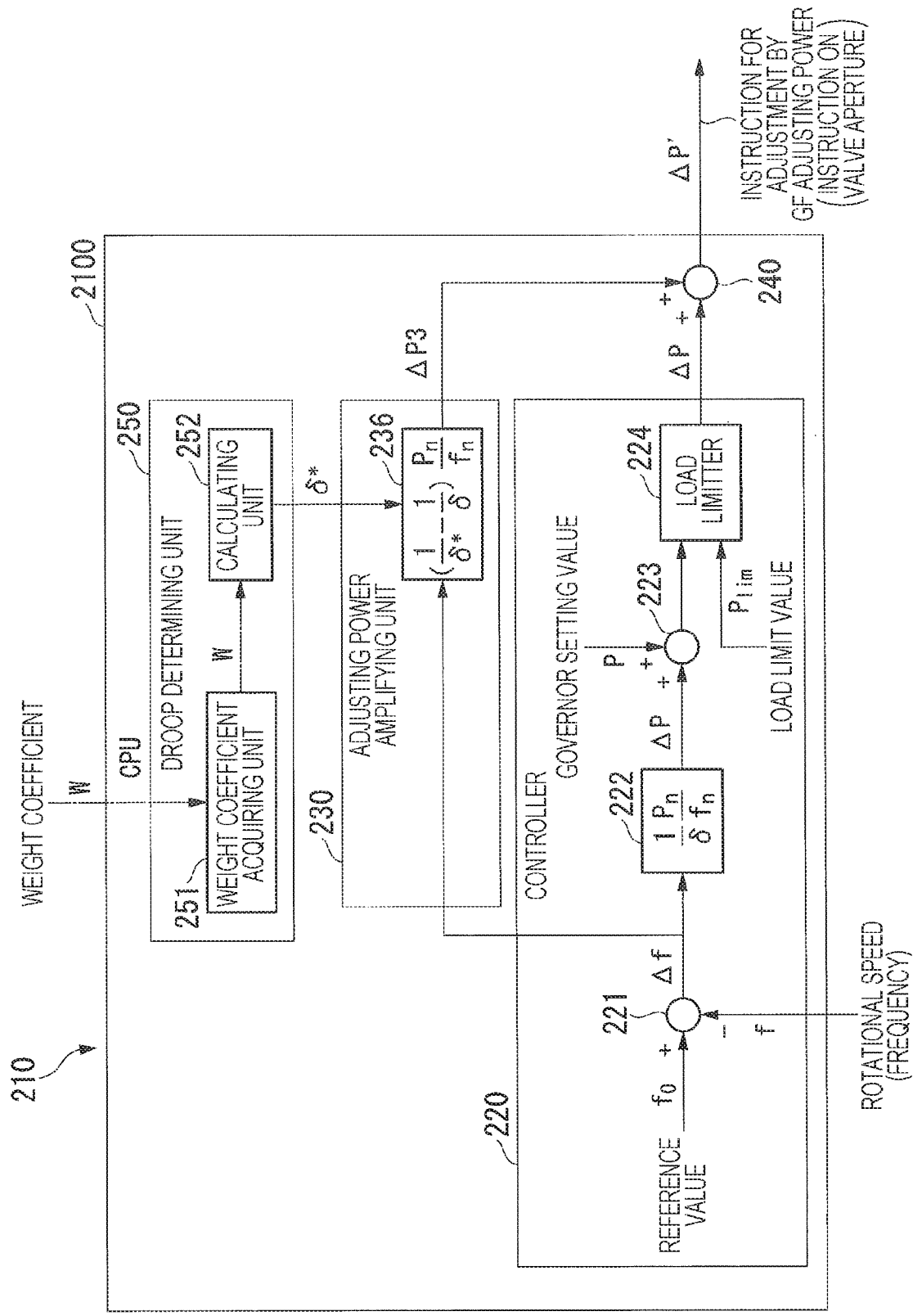
FIG. 18 is a block diagram illustrating a functional composition and a processing flow of the control device according to one or more embodiments.

FIG. 18 is a block diagram illustrating a functional composition and a processing flow of the control device according to one or more embodiments.

As illustrated in FIG. 18, the CPU 2100 of the control device 210 of one or more embodiments operates according to programs, and functions as a controller 220, adjusting power amplifying unit 230, adder 240, and droop determining unit 250.

The control device 210 of one or more embodiments changes the droop δ of the power source 21 based on the weight coefficient w obtained from the adjusting power instructing apparatus 10 to optimize the GF adjusting power so as to obtain more compensation. This enables the power generation companies G to autonomously increase the GF adjusting power without receiving the instruction from the transmission and distribution company T every time the GF adjusting power is in short supply.

The controller 220 (calculating unit 222) calculates a first adjusting power instruction value (ΔP) by multiplying the deviation (frequency deviation Δf) between the observed value of the rotation speed of the generator 212 and the reference value by the first proportional constant (1/δ·Pn/fn) containing the predefined droop δ. In one or more embodiments, the droop δ used by the calculating unit 222 also referred to as the "first droop." The first droop has a predefined value depending on characteristics of the generator 212 or the like.

The droop determining unit 250 (calculating unit 252) determines the most suitable droop so as to raise the value of the GF adjusting power in the power source 21. In one or more embodiments, the weight coefficients w are set so that the GF adjusting power becomes large as the responsiveness with respect to the frequency fluctuation is high, namely, as the delay time is small. The droop determining unit 250 determines a second droop (δ*) indicating the suitable droop based on the weight coefficient w acquired from the adjusting power instructing apparatus 10.

The adjusting power amplifying unit 230 calculates a third adjusting power instruction value ($ΔP_3$) by multiplying the frequency deviation Δf of the generator 212 by the second proportional constant containing the second droop δ* determined by the droop determining unit 250. The third adjusting power instruction value $ΔP_3$ indicates the degree of the increase of the adjusting power.

The adder 240 add the third adjusting power instruction value $ΔP_3$ to the first adjusting power instruction value ΔP to obtain the amplified adjusting power instruction value ΔP'.

The flow of processing by the droop determining unit 250, adjusting power amplifying unit 230, and adder 240 will be described in detail with reference to FIG. 18. As the processing flow of the controller 220 is same as that of the aforementioned embodiments, detailed descriptions thereof are omitted.

First, the processing by the droop determining unit 250 will be described in detail.

As illustrated in FIG. 18, a weight coefficient acquiring unit 251 acquires the weight coefficients w from the adjusting power instructing apparatus 10. The calculating unit 252 calculates the second droop δ* based on the weight coefficient w acquired by the weight coefficient acquiring unit 251.

The GF adjusting power subjected to payment of compensation is calculated by Formula (12) as described above. If the weighted frequency fluctuation measurement value dfw (t) at time t has an opposite sign (+ or −) to the active power fluctuation measurement value dP (t), the active power fluctuates to cancel the weighted frequency fluctuation measurement value dfw (t) at time t, and the active power fluctuation measurement value dP (t) functions as the GF adjusting power. From this viewpoint, the calculating unit 252 selects, as an optimization index, a probability J that the weighted frequency fluctuation measurement value dfw (t) has an opposite sign (+ or −) to the active power fluctuation measurement value dP (t). The probability J is expressed by Formula (14).

[Formula 14]

$$J = Pr(df_w \cdot dP < 0) \quad (14)$$

If the probability J becomes one (1), the active power fluctuation measurement values dP obtained at all times function as the adjusting power, and the GF adjusting power is maximized. A sufficient condition for realizing this is that there exists a positive constant C that satisfies Formula (15) below.

[Formula 15]

$$C \cdot df_w = -dP \quad (15)$$

When the power source 21 performs the GF operation, the power generation amount is adjusted depending of the frequency. When an impulse response of a transfer function from the frequency to the power generation amount is indicated with "g," the right side of the equation (15) is expressed by Formula (16) and the left side of the equation (15) is expressed by Formula (17).

[Formula 16]

$$-dp = -g * df \quad (16)$$

[Formula 17]

$$C \cdot df_w = C \cdot w * df \quad (17)$$

Therefore, the GF adjusting power is optimized when the impulse response g is adjusted to be as expressed by Formula (18).

[Formula 18]

$$-g = C \cdot w \quad (18)$$

FIG. 19 is a diagram illustrating example impulse responses according to one or more embodiments.

As illustrated in FIG. 19, the storage 2103 of the control device 210 previously stores, as a table D1, the impulse responses corresponding to the droops, respectively, calculated in advance.

The calculating unit 252 selects, as the second droop, the droop whose direction is closest to that of the weight coefficient w from the table D1. Specifically, the calculating unit 252 calculates Formula (19) to obtain the second droop δ* indicating the most suitable droop. In other words, the calculating unit 252 regards the impulse response g and the weight coefficient w as vectors, obtains an inner product of these vectors, determines the vectors whose inner product has the minimum cosine angle, and selects the droop corresponding to the impulse response g that makes the cosine angle minimum, as the most suitable droop, i.e., the second droop δ*. The symbol "gδ" indicates that the impulse response g conforms to the droop δ.

[Formula 19]

$$\delta^* = \underset{\delta \in \{3\%, 4\%, \ldots\}}{\mathrm{argmax}} \left\{ \delta \left| \left| \frac{\langle w, g_\delta \rangle}{\|w\| \|g_\delta\|} \right| \right. \right\} \quad (19)$$

Next, the processing by the adjusting power amplifying unit 230 will be described in detail.

The calculating unit 236 of one or more embodiments acquires the second droop δ* from the droop determining unit 250. The calculating unit 236 then calculates a third adjusting power instruction value (ΔP3) by multiplying the frequency deviation Δf by the second proportional constant ((1/δ*−1/δ)·Pn/fn) containing the second droop δ*.

Next, the processing by the adder 240 will be described in detail.

The adder 240 of one or more embodiments adds the third adjusting power instruction value ΔP3 to the first adjusting power instruction value ΔP to obtain the amplified adjusting power instruction value ΔP'. As a result, as expressed by Formula (20), the GF adjusting power instruction value ΔP' is calculated while replacing the predefined droop δ with the second droop δ* determined by the droop determining unit 250.

[Formula 20]

$$\Delta P' = \frac{1}{\delta^*} P_n \frac{\Delta f}{f_n} \quad (20)$$

The adder 240 then outputs, as the final GF adjusting power instruction, the amplified adjusting power instruction value ΔP' to the fuel supply valve V (FIG. 2).

According to the droop determining unit 250, adjusting power amplifying unit 230, and adder 240 of one or more embodiments, the most suitable second droop δ* can be determined and the GF adjusting power by the generator 212 can be amplified without changing the function of the controller 220.

As described above, the control device 210 of one or more embodiments determines the second droop δ* of the generator 212 based on the weight coefficient w depending on the response delay of the generator 212, and calculates the third adjusting power instruction value ΔP' indicating the degree of the increase of the GF adjusting power by multiplying the frequency deviation Δf by the second proportional constant ((1/δ*−1/δ)·Pn/fn) containing the determined second droop δ*. The control device 210 then amplifies the adjusting power of the generator 212 based on the third adjusting power instruction value ΔP'.

By calculating the amplified adjusting power instruction value ΔP' using the second droop δ* optimized depending on the weight coefficient w, the control device 212 can perform the output control so that the output of the generator 212 is counted, as the GF adjustment force, as much as possible.

The adjusting power instructing apparatus 10 transmits, as the GF adjusting power amplifying instruction, the weight coefficient w to the control device 210 of the generator 212 connected to the targeted power grid N1.

By previously transmitting the weight coefficient w to the power generation companies G, the transmission and distribution company T can cause the power generation companies G to autonomously adjust the GF adjusting power, without sending instructions every time the adjusting power for the frequency fluctuation is in short supply, and thereby the GF adjusting power can be flexibly procured.

Although the control device 210 obtains the weight coefficients w from the adjusting power instructing apparatus 10 in the aforementioned embodiments, the present invention is not limited thereto. In one or more embodiments, the storage 2103 of the control device 210 can previously store the weight coefficients w. In this case, the weight coefficient acquiring unit 251 of the droop determining unit 250 acquires the weight coefficients w from the storage 2103.

According to this structure, even when the communication network connecting the control device 210 and the adjusting power instructing apparatus 10 is temporarily disconnected, the control device 210 can appropriately adjust the output of the generator 212 referring to the weight coefficients w stored in the storage 2103.

(Variations of One or More Embodiments)

Figure 20:
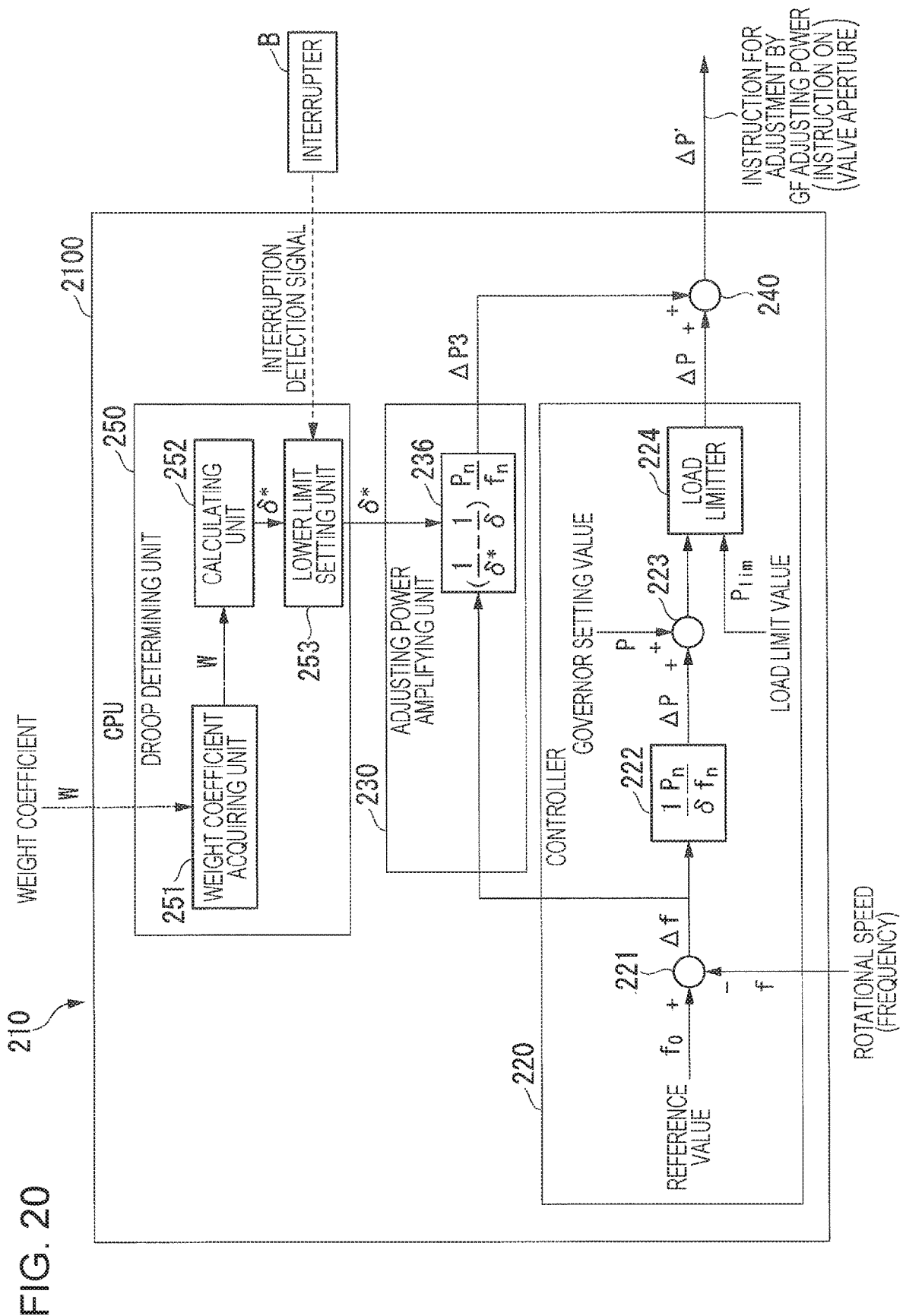
FIG. 20 is a block diagram illustrating a functional composition and a processing flow of the control device according to variations of one or more embodiments.

FIG. 20 is a block diagram illustrating a functional composition and a processing flow of the control device according to variations of one or more embodiments.

The droop determining unit 250 of variations of one or more embodiments further comprises a lower limit setting unit 253.

The lower limit setting unit 253 applies a predefined lower setting value to the second droop δ* calculated by the calculating unit 252, and output the result. As a result, the control device 210 can amplify the adjusting power within a range not exceeding the limit of power source 21 (turbine device 211, generator 212).

The lower limit setting unit 253 of one or more embodiments also receives the interruption detection signal from the interrupter B. The interrupter B has the same structure as that of the aforementioned variations of one or more embodiments.

Upon receiving the interruption detection signal from the interrupter B, the lower limit setting unit 253 sets the second droop δ* to the same value as the first droop δ. Thus, the lower limit setting unit 253 can invalidate the function of amplifying the GF adjusting power, upon disconnection of the generator 212, to prevent the hunting of the generator 212.

In one or more embodiments, when detecting the disconnection of the generator 212, the lower limit setting unit 253 limits the second droop δ* within a range where the hunting of the generator 212 can be prevented.

A power supply and demand system of one or more embodiments will be described with reference to FIGS. 21-24.

(Overall Structure of Power Supply and Demand System)

Figure 21:
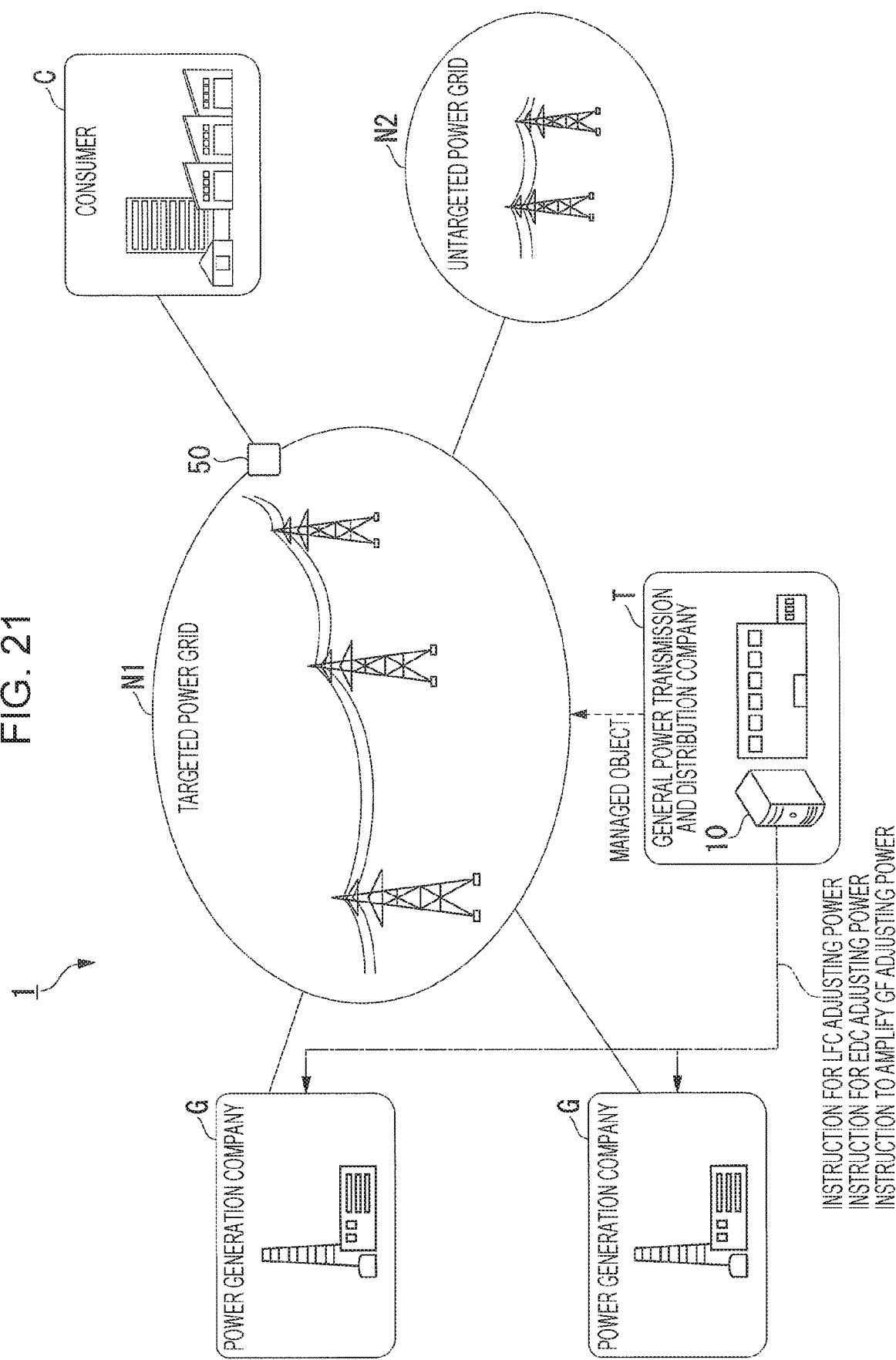
FIG. 21 is a diagram illustrating an overall structure of the power supply and demand system according to one or more embodiments.

FIG. 21 is a diagram illustrating an overall structure of the power supply and demand system according to one or more embodiments.

As illustrated in FIG. 21, the power supply and demand system 1 of one or more embodiments comprises at least one measurement instrument 50 at a representative point of the targeted power grid N1. For example, the measurement instrument 50 is installed at the connection point between the consumer C and the targeted power grid N1. The measurement instrument 50 can measure the frequency (representative frequency) at the representative point.

The adjusting power instructing apparatus 10 of one or more embodiments receives the measurement result (representative frequency measurement value f) of the representative frequency at the representative point from the measurement instrument 50.

The adjusting power instructing apparatus 10 transmits the appropriate weight coefficient w (GF adjusting power amplifying instruction) depending on the measurement result of the measurement instrument 50.

(Functional Composition of Adjusting Power Instructing Apparatus)

Figure 22:
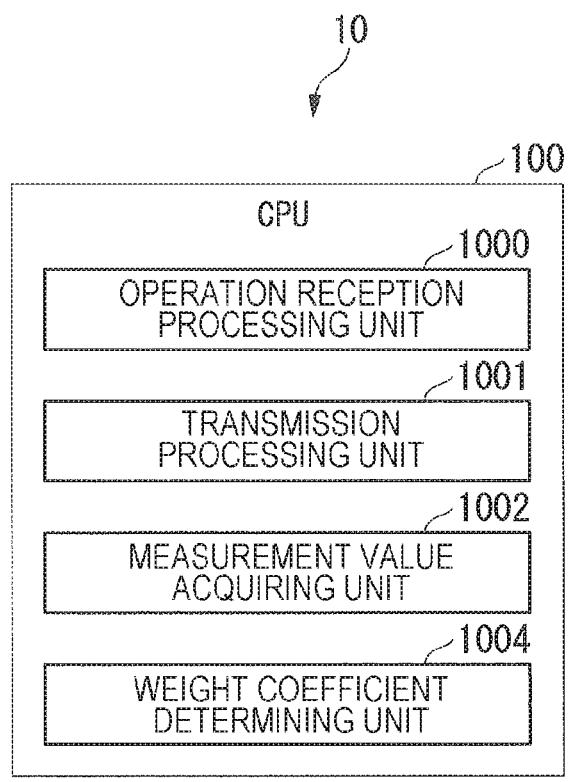
FIG. 22 is a block diagram illustrating a functional composition of the adjusting power instructing apparatus according to one or more embodiments.

FIG. 22 is a block diagram illustrating a functional composition of the adjusting power instructing apparatus according to one or more embodiments.

As illustrated in FIG. 22, the CPU 100 of the adjusting power instructing apparatus 10 of one or more embodiments operates according to programs, and functions as an operation reception processing unit 1000, transmission processing unit 1001, measurement value acquiring unit 1002, and weight coefficient determining unit 1004.

As the operation reception processing unit 1000 and the transmission processing unit 1001 have the same functions as those of the aforementioned embodiments, detailed descriptions thereof are omitted.

The measurement value acquiring unit 1002 acquires the representative frequency measurement value f at the representative point of the targeted power grid N1 from the measurement instrument 50. The representative frequency measurement values f acquired by the measurement value acquiring unit 1002 are stored and accumulated in the storage 104.

The weight coefficient determining unit 1004 determines the weight coefficient w based on the measurement result by the measurement instrument 50.

The transmission processing unit 1001 transmits, as the GF adjusting power amplifying instruction, the weight coefficient w determined by the weight coefficient determining unit 1004.

(Functional Composition and Processing Flow of Adjusting Power Instructing Apparatus)

Figure 23:
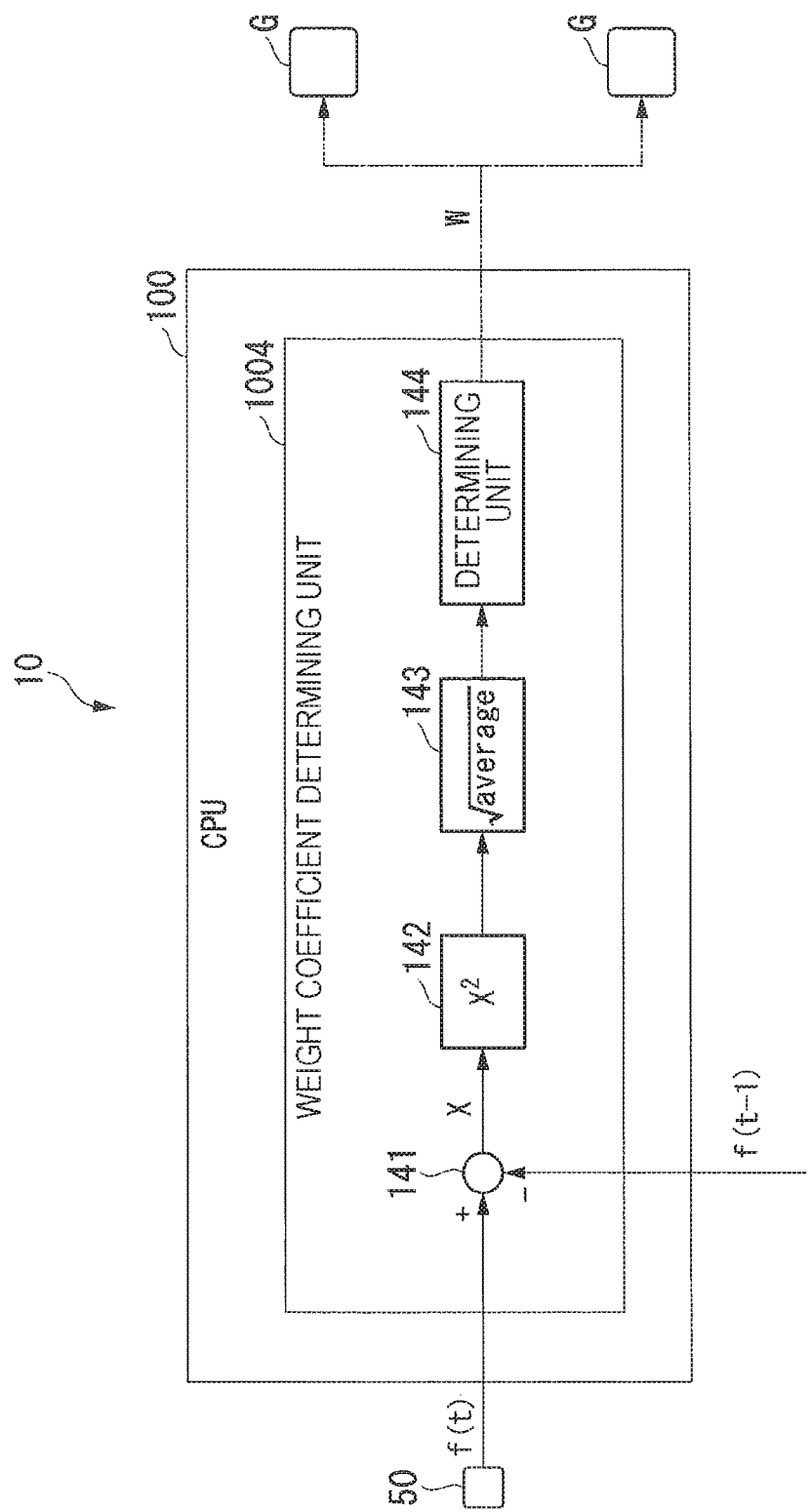
FIG. 23 is a block diagram illustrating a functional composition and a processing flow of the adjusting power instructing apparatus according to one or more embodiments.

FIG. 23 is a block diagram illustrating a functional composition and a processing flow of the adjusting power instructing apparatus according to one or more embodiments.

The flow of processing executed by the CPU 100 will be described with reference to FIG. 23.

First, the weight coefficient determining unit 1004 acquires the representative frequency measurement value f at the representative point of the targeted power grid N1 via the measurement instrument 50 and the measurement value acquiring unit 1002 (FIG. 22).

A calculating unit 141 obtains a difference x between the representative frequency measurement value f (t) acquired at time t and the previously-acquired representative frequency measurement value f (t−1) stored in the storage 104.

Next, a calculating unit 142 calculates a square ($x^2$) of the difference x. A calculating unit 143 calculates a squire root of the average value of $x^2$. In other words, the calculating units 142, 143 obtain a root mean square (RMS) of the difference x.

Next, a determining unit 144 determines the weight coefficient w depending on the RMS of the difference x. For example, the determining unit 144 selects the weight coefficient w, from the predefined weight coefficient table D2 (FIG. 24), depending on the RMS of the difference x.

FIG. 24 is an example weight coefficient table according to one or more embodiments.

As illustrated in FIG. 24, the storage 104 of one or more embodiments previously stores the weight coefficient table D2. The weight coefficient table D2 predefines the weight coefficient w for each delay time depending on the representative frequency fluctuation (difference x). In one or more embodiments, the weight coefficients w on high responsiveness side are set to be more weighted, as the fluctuation (difference x) of the representative frequency is larger. In other words, the weight becomes large as the delay time is small.

As described above, the adjusting power instructing apparatus 10 of one or more embodiments determines the weight coefficient based on the difference between the frequency measured at the representative point of the targeted power grid N1 and the previously-acquired representative frequency.

As a result, the adjusting power instructing apparatus 10 leads the GF adjusting power of the power generation companies G to the side increasing the responsiveness, which increases the stability of the targeted power grid N1.

In one or more embodiments, various processes executed by the adjusting power instructing apparatus 10 and the control device 210 are stored in form of programs in a computer-readable recording medium, and the various processes are executed by reading out and executing the programs. The computer-readable recording medium contains a magnetic disk, magneto optical disk, CD-ROM, DVD-ROM, and semiconductor memory. The computer programs can be distributed to a computer via a communication line, and executed by the computer that received the distributed programs.

The programs may be for realizing a part of the aforementioned functions. Moreover, the programs may be for realizing the aforementioned functions in combination with programs already recorded in a computer system, namely, may be a difference file (difference program).

In one or more embodiments, another computer connected to the adjusting power instructing apparatus 10 and the control device 210 can be provided with a part of the functions of the adjusting power instructing apparatus 10 and the control device 210.

Although the control device 210 acquires, as the GF adjusting power amplifying instruction, the weight coefficient w from the adjusting power instructing apparatus 10, and calculates the second droop δ* in the aforementioned embodiments, the present invention is not limited thereto. In one or more embodiments, the adjusting power instructing apparatus 10 calculates the second droop δ* and transmits the same to the power generation companies G.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A power source comprising:
   a generator;
   a turbine device that drives and rotates the generator; and
   a control device that:
   monitors a rotation speed of the generator;
   calculates a first adjusting power instruction value corresponding to a deviation between a reference value and an observed value of the rotation speed of the generator;
   acquires an adjusting power amplification coefficient from an external device;
   calculates a second adjusting power instruction value indicating a degree of increase of the adjusting power, based on the first adjusting power instruction value and the adjusting power amplification coefficient;
   amplifies the adjusting power based on the second adjusting power instruction value; and
   outputs the amplified adjusting power to the turbine device to adjust power supply from the generator and reduces fluctuation of frequency in a power transmission and distribution system.

2. The power source according to claim 1, wherein the control device further:
   calculates an amplified adjusting power instruction value by adding the first adjusting power instruction value and the second adjusting power instruction value,
   the first adjusting power instruction value is calculated by multiplying the deviation by a predefined first proportional constant,
   the second adjusting power instruction value is calculated by multiplying the first adjusting power instruction value by the adjusting power amplification coefficient; and
   increases the adjusting power using the amplified adjusting power instruction value.

3. The power source according to claim 2, wherein the control device further:
   receives, as an instruction from the external device, an adjustment value for increasing or decreasing the adjusting power amplification coefficient; and
   calculates the adjusting power amplification coefficient by time-integrating the adjustment value for increasing or decreasing the adjusting power amplification coefficient.

4. The power source according to claim 2, wherein the control device further:
   decreases the adjusting power amplification coefficient when the generator is disconnected.

5. The power source according to claim 1, wherein the control device comprises:
   a low-frequency cutoff filter that cuts off a low-frequency band of the deviation.

6. A power source comprising:
   a generator;
   a turbine device that drives and rotates the generator; and
   a control device that:
   monitors a rotation speed of the generator;
   calculates a first adjusting power instruction value by multiplying, by a first proportional constant containing a predefined first droop, a deviation between a reference value and an observed value of the rotation speed of the generator;
   determines a second droop of the generator based on a weight coefficient corresponding to a response delay of the generator;
   calculates a third adjusting power instruction value indicating a degree of increase of the adjusting power by multiplying the deviation by a second proportional constant containing the second droop;
   amplifies the adjusting power based on the third adjusting power instruction value; and
   outputs the amplified adjusting power to the turbine device to adjust power supply from the generator and reduces fluctuation of frequency in a power transmission and distribution system.

7. The power source according to claim 6, wherein the control device further:
   calculates an amplified adjusting power instruction value by adding the first adjusting power instruction value and the third adjusting power instruction value; and
   increases the adjusting power using the amplified adjusting power instruction value.

8. The power source according to claim 6, wherein the control device further:
   decreases the second droop when the generator is disconnected.

9. An adjusting power instructing apparatus comprising:
a communication interface; and
a processor that:
   transmits, to a control device for a generator connected to a targeted power grid, via the communication interface, an instruction to increase a proportional constant of an adjusting power that the control device outputs depending on a deviation between a reference value and an observed value of a rotation speed of the generator;
   acquires an active power measurement value of active power exchanged at a connection point between the targeted power grid and another power grid, and a frequency measurement value of frequency at the connection point;
   calculates an adjusting power coefficient indicating a degree of influence that fluctuation in the active power has on fluctuation in the frequency, based on the active power measurement value and the frequency measurement value; and
   transmits, to the control device via the communication interface, an instruction indicating a degree of increase of the proportional constant depending on a deviation between the adjusting power coefficient and a target value of the adjusting power coefficient.

10. The adjusting power instructing apparatus according to claim 9, wherein
the processor further:
   acquires the active power measurement value and the frequency measurement value at the connection point belonging to a region within the target power grid;
   calculates the adjusting power coefficient regarding the region based on the active power measurement value and the frequency measurement value; and
   transmits, to the control device for the generator belonging to the region, via the communication interface, the instruction depending on a deviation between the adjusting power coefficient regarding the region and a target value of the adjusting power coefficient regarding the region.

* * * * *